(12) United States Patent
Fowles et al.

(10) Patent No.: US 12,530,642 B2
(45) Date of Patent: Jan. 20, 2026

(54) SYSTEMS AND METHODS FOR LINKING DATA ENTRIES IN DATABASE SYSTEMS

(71) Applicant: Blackthorn IP, LLC, Pleasant Grove, UT (US)

(72) Inventors: Russell E. Fowles, Pleasant Grove, UT (US); Chase Kitteridge, Pleasant Grove, UT (US); Michael Bonner, Pleasant Grove, UT (US)

(73) Assignee: Blackthorn IP, LLC, Lehi, UT (US)

( * ) Notice: Subject to any disclaimer, the term of this patent is extended or adjusted under 35 U.S.C. 154(b) by 309 days.

(21) Appl. No.: 18/067,675

(22) Filed: Dec. 16, 2022

(65) Prior Publication Data

US 2023/0230000 A1 Jul. 20, 2023

Related U.S. Application Data

(60) Provisional application No. 63/290,818, filed on Dec. 17, 2021.

(51) Int. Cl.
| | |
|---|---|
| *G06Q 10/0631* | (2023.01) |
| *G06F 16/23* | (2019.01) |
| *G06F 16/25* | (2019.01) |
| *G06F 16/27* | (2019.01) |
| *G06Q 10/10* | (2023.01) |

(Continued)

(52) U.S. Cl.
CPC ... *G06Q 10/06313* (2013.01); *G06F 16/2379* (2019.01); *G06F 16/254* (2019.01); *G06F 16/278* (2019.01); *G06Q 10/063114* (2013.01); *G06Q 10/103* (2013.01); *G06Q 10/1091* (2013.01); *H04L 43/0811* (2013.01); *H04L 43/10* (2013.01); *H04L 47/215* (2013.01); *H04L 47/625* (2013.01)

(58) Field of Classification Search
CPC ....... G06Q 10/00–50/00; G06F 1/00–2123/00; H04L 1/00–2463/00
USPC ................................................. 705/7.11–7.42
See application file for complete search history.

(56) References Cited

U.S. PATENT DOCUMENTS

| | | | |
|---|---|---|---|
| 9,177,267 B2 * | 11/2015 | Kass ...................... | G06Q 10/00 |
| 10,540,620 B2 * | 1/2020 | Torres .............. | G06Q 10/06313 |

(Continued)

OTHER PUBLICATIONS

Limaye, Girija, Sunita Sarawagi, and Soumen Chakrabarti. "Annotating and searching web tables using entities, types and relationships." Proceedings of the VLDB Endowment 3.1-2 (2010): 1338-1347. (Year: 2010).*

(Continued)

*Primary Examiner* — Alan S Miller
(74) *Attorney, Agent, or Firm* — TechLaw Ventures, PLLC; Terrence J. Edwards

(57) ABSTRACT

Systems, methods, and devices for data ingestion, database management, and data security. A method includes storing a plurality of data entries in a project bucket on a database, wherein the plurality of data entries represents information applicable to a plurality of data units associated with a project. The method includes organizing at least a portion of the plurality of data units according to a polymorphous data schema. The method includes linking two or more data units of the plurality of data units to generate a project linkage. The method further includes restricting a user from removing only a portion of the project linkage from the project without first manually breaking the project linkage.

20 Claims, 25 Drawing Sheets

(51) Int. Cl.
*G06Q 10/1091* (2023.01)
*H04L 43/0811* (2022.01)
*H04L 43/10* (2022.01)
*H04L 47/215* (2022.01)
*H04L 47/625* (2022.01)

(56) References Cited

U.S. PATENT DOCUMENTS

| | | | |
|---|---|---|---|
| 10,970,395 B1* | 4/2021 | Bansal | G06F 21/566 |
| 2008/0229214 A1* | 9/2008 | Hamilton | G06Q 10/1091 |
| | | | 715/751 |
| 2013/0191417 A1* | 7/2013 | Petrie | G06Q 10/10 |
| | | | 707/783 |
| 2018/0069888 A1* | 3/2018 | Muddu | G06N 7/01 |
| 2020/0301940 A1* | 9/2020 | Hollander | G06F 16/254 |
| 2021/0097120 A1* | 4/2021 | Gutierrez | G06F 7/32 |

OTHER PUBLICATIONS

Liu, Ling, et al. "The role of polymorphic reuse mechanisms in schema evolution in an object-oriented database." IEEE transactions on Knowledge and Data Engineering 9.1 (1997): 50-67. (Year: 1997).*

* cited by examiner

SYSTEMS AND METHODS FOR LINKING DATA ENTRIES IN DATABASE SYSTEMS

TECHNICAL FIELD

The present disclosure relates to systems and methods for data ingestion and storage and particularly relates to ingesting data across a plurality of independent sources and partitioning and querying the ingested data.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. It will be appreciated by those of ordinary skill in the art that the various drawings are for illustrative purposes only. The nature of the present disclosure, as well as other embodiments in accordance with this disclosure, may be more clearly understood by reference to the following detailed description, to the appended claims, and to the several drawings.

DETAILED DESCRIPTION

Figure 1:
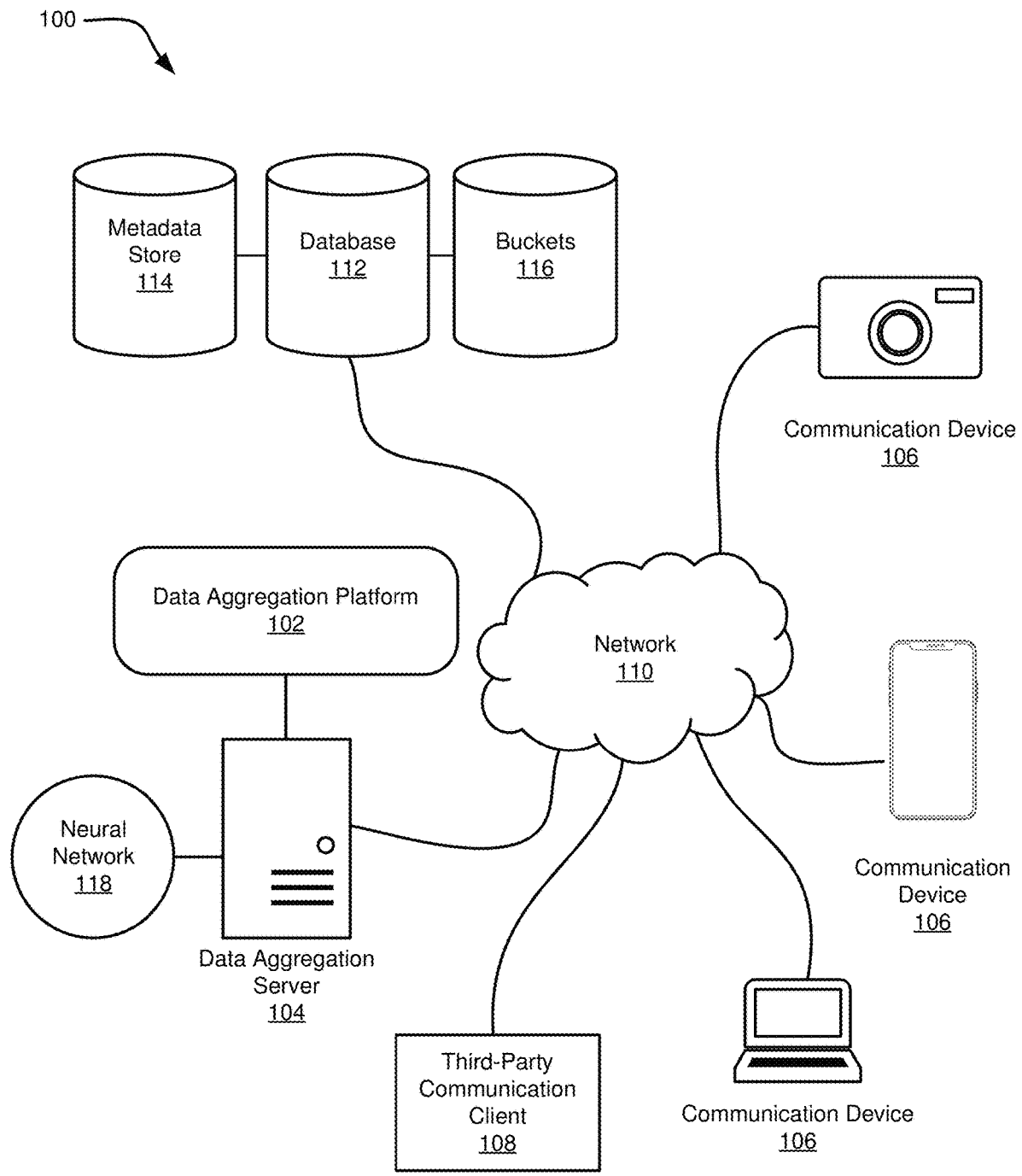
FIG. 1 is a schematic diagram of a system for data aggregation that can be implemented for increasing efficiency of computing systems for ingesting, storing, and analyzing data.

Disclosed herein are systems, methods, and devices for database management and data analysis. Specifically disclosed herein are database systems for storing, querying, and analyzing independent datasets directed to different topics and assigned to different entities. Further disclosed herein are data ingestion processes for receiving and retrieving data from a plurality of independent sources and then partitioning that data across a database system.

In one example implementation, the systems, methods, and devices described herein form a data aggregation platform for construction project management. The data aggregation platform described herein manages the tasks and task units that must be performed to complete a project. The data aggregation platform additionally manages the personnel, equipment, vehicles, tools, rental agreements, labor budgets, equipment budgets, contracts, and tasks associated with the project. The data aggregation platform leverages machine learning algorithms and neural networks to perform real-time analysis of images, videos, documents, and other files to verify the authenticity of user inputs. The database schema described herein enables the data aggregation platform to provide real-time data analysis on interrelated but disparate datapoints received from different data sources, including datapoints pertaining to workers, equipment, rental agreements, tools, supplies, budgets, and so forth.

Numerous industries struggle with efficient data collection and organization. For example, the construct and project management industries are often required to manage copious quantities of equipment, supplies, and personnel. It can be challenging to track labor, equipment, and supplies in real-time while also tracking the completion of certain tasks. This same struggle applies to any industry that manages numerous disparate types of data that might be retrieved and updated from various sources.

Additionally, data aggregation generally presents numerous challenges, and these challenges are aggravated when data is retrieved from disparate sources that implement different protocols and conventions for classifying information. Even when data is gathered and summarized, further analysis is usually required before the aggregated data can be shared with, or communicated to, different audiences, or used as the basis for decision-making. Data aggregation includes collecting data, checking the data, verifying the data, transferring the data, and compiling the data, assessing quality of the data, packaging the data, disseminating the data, and reporting the data, and using the data for action. Each of these steps presents unique technical challenges when the data is retrieved from disparate sources that implement different conventions and protocols for classifying and organizing information.

Considering the foregoing, disclosed herein are systems, methods, and devices for resolving the technical challenges presented when aggregating data retrieved from one or more communication channels. The systems, methods, and devices described herein include means for securely and efficiently ingesting files and datapoints from a plurality of different sources, and then analyzing those files and datapoints to identify common classifications for the information described therein. The systems, methods, and devices described herein are implemented for classifying information, translating data describing the information, and then matching the data to "data buckets" that are associated with certain projects.

Before the structure, systems, and methods are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

The computer readable storage medium described herein can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Referring now to the figures, FIG. 1 is a schematic diagram of a system 100 for data aggregation that can be implemented for increasing the efficiency of computing systems for ingesting, storing, and analyzing data. The system 100 includes a data aggregation platform 102 operated by a data aggregation server 104. The system 100 includes one or more communication devices 106 that receive and transmit information by way of the network 110. The system 100 includes a database 112 for storing ingested and partitioned data, training datasets, structured data, unstructured data, and so forth. The database 112 includes a metadata store 114 and one or more data buckets 116. Each of the data aggregation server 104, the database 112, and the communication devices 106 is in communication with a network 110 such as the Internet.

The data aggregation platform 102 stores, manages, and updates aggregated data packages. The data aggregation platform 102 includes a user interface and logic for managing datasets and enabling users to query, retrieve, and analyze the data. The data aggregation platform 102 is operated by the data aggregation server 104, which is in communication with other entities and databases by way of Application Program Interfaces (APIs), Secure File Transfer Protocols (SFTP), or other connections by way of the network 110.

The communication devices 106 include personal computing devices that can communicate with the data aggregation server 104 by way of the network 110. The communication devices 106 may include, for example, mobile phones, laptops, personal computers, servers, server groups, tablets, image sensors, cameras, scanners, desktop computers, set-top boxes, gaming consoles, smart televisions, smart watches, fitness bands, optical head-mounted displays, virtual reality headsets, smart glasses, HDMI or other electronic display dongles, personal digital assistants, and/or another computing device comprising a processor (e.g., a central processing unit (CPU)), a processor core, image sensors, cameras, a field programmable gate array (FPGA), or other programmable logic, an application specific integrated circuit (ASIC), a controller, a microcontroller, and/or another semiconductor integrated circuit device, a volatile memory, and/or a non-volatile storage medium. The communication devices 106 may comprise processing resources for executing instructions stored in non-transitory computer readable storage media. These instructions may be incorporated in an application stored locally to the communication device 106, an application accessible on a web browser, and so forth. The application enables a user to access the user interface for the data aggregation platform 102 to check submissions, upload files, verify whether files are accurately uploaded, receive feedback from the neural network 118, and so forth.

In an embodiment, a user accesses an account associated with the data aggregation platform 102 by way of the communication device 106. The user may be assigned a security role and location access to as many, or few, entities as is required by the user's position. Security roles restrict what information and/or functionality the user can access. The data aggregation platform 102 may be accessible on a mobile phone application. The mobile phone application uses the camera and networking capabilities of the mobile phone to capture images and upload those images to the data aggregation server 104 and neural network 118 for analysis.

The third-party communication clients 108 facilitate communications between users. The third-party communication clients 108 facilitate any applicable form of communication, including, for example, email, telephone, video conferencing, voice conferencing, VOIP (Voice over Internet Protocol), text messaging, web-based communications, fax, and so forth.

The third-party communication clients 108 include email communication clients. Examples include email services accessible to the public serviced by, Gmail®, Yahoo®, Apple®, AOL®, and so forth. Additionally, the email communication clients include email services that are not accessible to the public, including those services that are dedicated to workplaces, government agencies, private server groups, and so forth. The third-party communication clients 108 include telephonic communication clients. Examples of telephone communication providers include Comcast®, Verizon®, T-Mobile®, AT&T®, and so forth. The third-party communication clients 108 include video conferencing, VOIP, and audio-conferencing providers, such as, for example, Microsoft®, Zoom®, and others. The third-party communication clients 108 include text messaging service providers including, for example, Verizon®, T-Mobile®, AT&T®, and so forth. The third-party communication clients 108 include communication channels supported by social media websites and applications. The data aggregation server 104 may integrate with any suitable communication channel.

The database 112 is a repository of information, datasets, images, structured data, unstructured data, and training datasets for the neural network 118. The data aggregation server 104 may access the database 112 by way of an Application Program Interface (API) over the network 110 connection. The API allows the data aggregation server 104 to receive automatic updates from the database 112 as needed. In an embodiment, the database 112 is integrated on the data aggregation server 104 and is not independent of the storage and processing resources dedicated to the data aggregation server 104.

Data stored in the remote or cloud storage, such as the database 112, may include data, including images and related data, from many different entities, customers, locations, or the like. The stored data may be accessible to a classification system that includes a classification model, neural network, or other machine learning algorithm.

Each independent database instance within the database 112 is partitioned into a plurality of tables. In an example implementation, the data aggregation platform 102 is used for managing various construction projects implemented by different clients. Each client account may have separate tables for each construction projected that is being planned or executed by that client. The different client accounts are assigned independent database instances, so there is no threat of crosstalk or sharing of project information between different client accounts. One construction project may include a plurality of jobs, and each of the plurality of jobs may include a plurality of tasks that must be completed. In various implementations, the database 112 may include separate tables for each project, each job, and/or each task. The database 112 may include separate tables for storing a listing of employees or contractors, a listing of tasks to be executed, a listing of tools, a listing of equipment, a listing of construction schedules, a listing of work history data, and so forth.

The database 112 may include a plurality of database instances, wherein each database instance may be assigned to a different client account. In an implementation, the data aggregation platform 102 is implemented for ingesting, translating, and aggregating data for aggregated data packages, and in this case, the database 112 may include an independent database instance for each entity using the data aggregation platform 102. In an alternative embodiment, the data for each entity is stored in the same physical memory location, and permissions for reading or writing the data is controlled by way of permissions managed by the data aggregation platform 102.

The database 112 includes and/or communicates with a metadata store 114 and a bucket 116. In various implementations, the metadata store 114 and the bucket 116 may be considered a component of the database 112, and in other implementations, they may be separate database structures that operate independently of the database 112. The metadata store 114 includes a listing of where information is stored on the database 112. The metadata store 114 may specifically include tables storing metadata about non-structured files stored in the bucket 116, and the metadata store 114 may additionally include an indication of where those non-structured file can be located within the bucket 116. The bucket stores non-structured files such as videos, images, documents, PDFs, and other files.

The metadata store 114 comprises a table for media. The media table includes metadata information about all media stored in the bucket 116. The metadata information includes, for example, geographical coordinate information, name, purpose, classification (e.g., what the media is depicting or why the media was captured), and timestamp. The media table further includes an indication of where the media can be retrieved from the bucket 116. The media table on the metadata store 114 points to where the media itself is stored on the bucket 116 and further points to a table that describes the media. The table describing the media may include, for example, an independent table on the database 112 describing what is depicted in the media. For example, if the media includes an image of a grouping of tools, then the metadata store 114 may point to a table on the database 112 that identifies all tools that should be included within that specific grouping of tools depicted in the image. The media table on the metadata store 114 is a polymorphic many-to-many table. The media itself (stored on the bucket 116) may be applied to any other model or table.

The data aggregation server 104 automatically resizes incoming media to a plurality of different sizes. Each of the plurality of different sizes is stored on the bucket 116. The media table on the metadata store 114 includes a column indicating which sizes of the media have been generated and includes another column pointing to where each size can be located on the bucket 116.

The database 112 may be structured as a relational database. In a relational database, files and data are stored with predefined relationships to one another. The files and data are organized as a set of tables with columns and rows, and tables are used to hold information about the objects to be represented in the database 112.

The database 112 may be structured as a directed graph file system (which may be referred to as a semantic file system). The directed graph file system structures data according to semantics and intent, rather than location. The directed graph file system allows data to be addressed by content (associative access).

The neural network 118 comprises storage and processing resources for executing a machine learning or artificial intelligence algorithm. The neural network 118 may include a deep learning convolutional neural network (CNN). The convolutional neural network is based on the shared weight architecture of convolution kernel or filters that slide along input features and provide translation equivalent responses known as feature maps. The neural network 118 may include one or more independent neural networks trained to implement different machine learning processes.

Figure 2A:
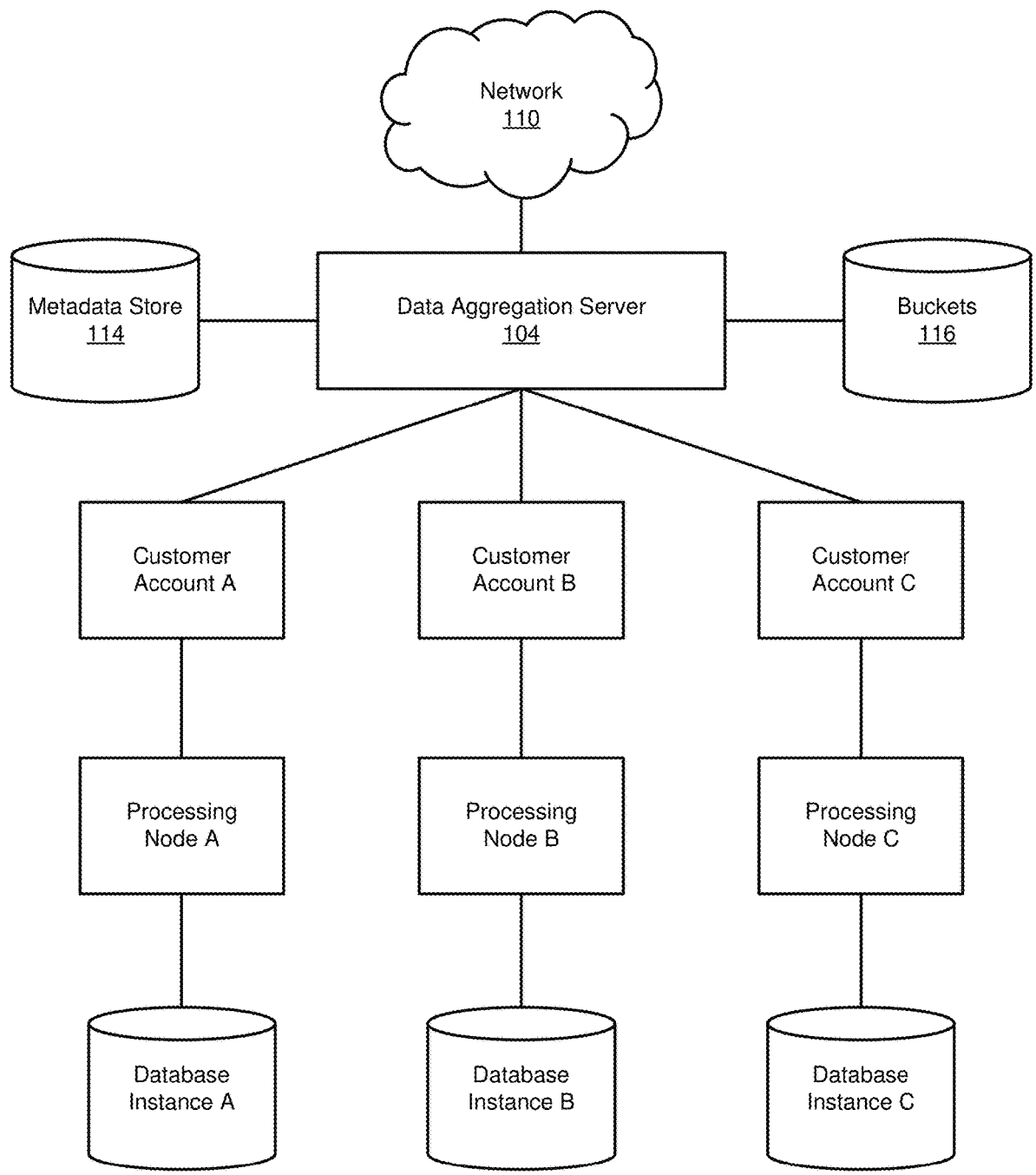
FIGS. 2A and 2B are schematic diagrams of an organization schema for data management and permissioned access to database entries
Figure 2B:
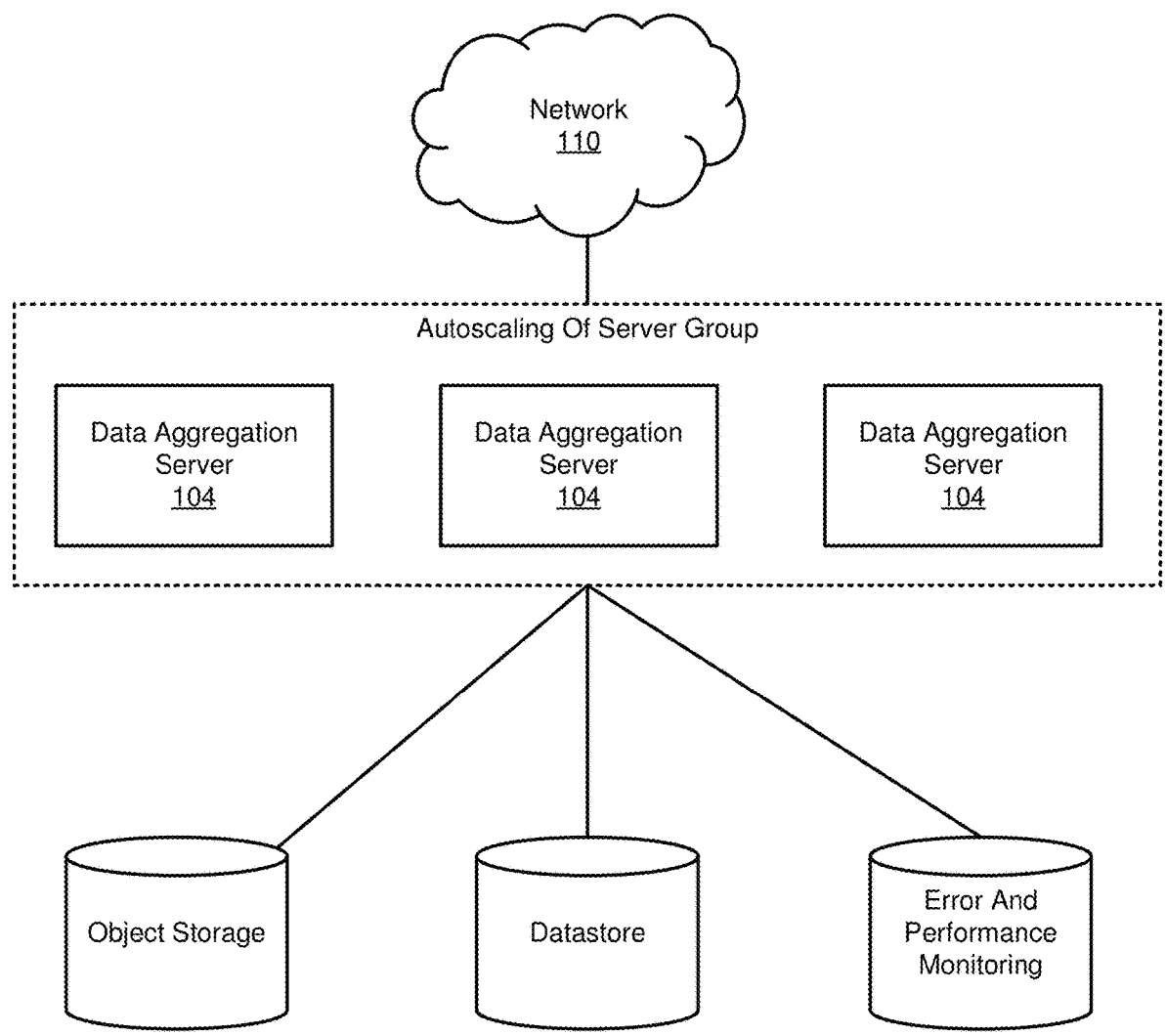

FIGS. 2A and 2B are schematic diagram of a system for data management and permissioned access to database entries. The systems described herein may be implemented in environments with highly sensitive data, and therefore, it can be imperative to ensure there is no crosstalk between customer or applicant accounts. The system includes a resource manager executed by the data aggregation server 104.

The data aggregation server 104 oversees data ingestion and data management for a plurality of client accounts, such as Customer Account A, Customer Account B, and Customer Account C. The data aggregation server 104 manages an execution platform that includes a plurality of processing nodes associated with the client accounts. The customer accounts may share the processing resources of the execution platform and/or may be assigned independent processing resources. FIG. 2A illustrates a plurality of processing nodes within the execution platform, including Processing Node A, Processing Node B, and Processing Node C.

The data aggregation server 104 manages the ingestion, normalization, organization, and storage of data entries within the storage resources. The storage resources include data entries pertaining to transactions associated with the client accounts. The customer accounts may have secure, permissioned access to data entries based on permissions metadata stored on the metadata store 114. The storage resources include data entries stored across a plurality of database instances, including, for example, Database Instance A, Database Instance B, and Database Instance C. It should be appreciated that the data aggregation server 104 may be in communication with any number of client accounts, processing nodes, and client database instances.

The storage resources store data in partitions that can be queried by the data aggregation server 104. The data entries in the storage resources are immutable such that the entries cannot be deleted or modified and can only be replaced by storing a new, superseding data entry.

The network 110 includes any type of network, such as a local area network, a wide area network, the Internet, a cellular communication network, or any combination of two or more communication networks. The data aggregation server 104 communicates with some client accounts and outside parties by way of communication protocols such as SWIFT MT (Society for Worldwide Interbank Financial Telecommunication Message Type) messages (such as MT 2XX, 5XX, 9XX), ISO 9022 (a standard for electronic data interchange between financial institutions), and proprietary application interfaces. The data aggregation server 104 ingests data and receives communications from client accounts (and entities associated with the client accounts) using secure APIs (Application Program Interfaces) and other protocols. The data aggregation server 104 can integrate with existing financial institutions, banks, clearinghouses, and exchanges without significant modification to the institution's systems.

The data aggregation server 104 determines whether a user is authorized, and what data that user is authorized to access. The data aggregation server 104 verifies the identity of each machine using security certificates and cryptographic keys. The data aggregation server 104 stores a listing of authorized users and roles, which may include actual users, systems, devices, or applications that are authorized to interact with the data aggregation server 104 and/or access certain data stored on the storage resources. The integrity of the system is provided using secure channels to communicate between the data aggregation server 104 and external systems. In some embodiments, communication between the data aggregation server 104 and external systems is performed using highly secure TLS (Transport Layer Security) with well-established handshakes between the data aggregation server 104 and the external systems. Implementations may use dedicated virtual private clouds (VPCs) for communication between the data aggregation server 104 and any external systems. Dedicated VPCs offer clients the ability to set up their own security and rules for accessing data aggregation server 104. In some situations, an external system or user may use the DirectConnect network service for better service-level agreements and security.

The data aggregation server 104 supports role-based access control of workflows and the actions associated with workflows. In some embodiments, users can customize a workflow to add custom steps to integrate with external systems. Additionally, system developers can develop custom workflows to support new business processes. In particular implementations, some of the actions performed by a workflow can be manual approvals, a SWIFT message request/response, scheduled or time-based actions, and the like. In some embodiments, roles can be assigned to users and access control lists can be applied to roles. An access control list controls access to actions and operations on entities within a network. This approach provides a hierarchical way of assigning privileges to users. A set of roles also include roles related to replication of data, which allows the data aggregation server 104 to identify what data can be replicated and who is the authorized user to be receiving the data at an external system.

The data aggregation platform 102 manages authentication of users. Authentication refers to how a user signs into the data aggregation platform 102 to access data within the database 112. The user must be authenticated as the root user or an Identity and Access Management (IAM) role. Additionally, a user may be assigned a tenant's single sign-on authentication. In these cases, an administrator previously set up identity federation using IAM roles. The data aggregation platform 102 manages root users, IAM users and groups, and service administrators. The data aggregation platform 102 provides cross-service access to some features with principal permissions, service roles, or service-linked roles.

The data aggregation platform 104 logically classifies data that is ingested from disparate sources and then partitions the data with assigned partitions across the multiple database instances. The data aggregation server 104 classifies data, controls user access, ensures privacy between users and their communications, and combines the data into an aggregated data package.

FIG. 2B is a schematic diagram of a system for data management and permissioned access to database entries, and the system illustrated in FIG. 2B may be implemented with structural components described in connection with FIG. 2A.

FIG. 2B illustrates wherein the data aggregation server 104 is serviced by a plurality of servers. This group of servers receives data inputs over a network 110 connection. The data inputs are autoscaled across the plurality of instances of the data aggregation server 104 to reduce latency and improve system performance. The data aggregation server 104 then communicates with a plurality of storage resources for storing different types of data.

In an implementation, the data aggregation server 104 communicates with an S3 storage resource (such as Amazon Web Services®) for storing objects. The data aggregation server 104 may further communicate with a relational database for managing a datastore. The data aggregation server 104 may additionally communicate with another storage resource when performing error and performance monitoring for managing and improving the data aggregation platform 102.

Figure 3:
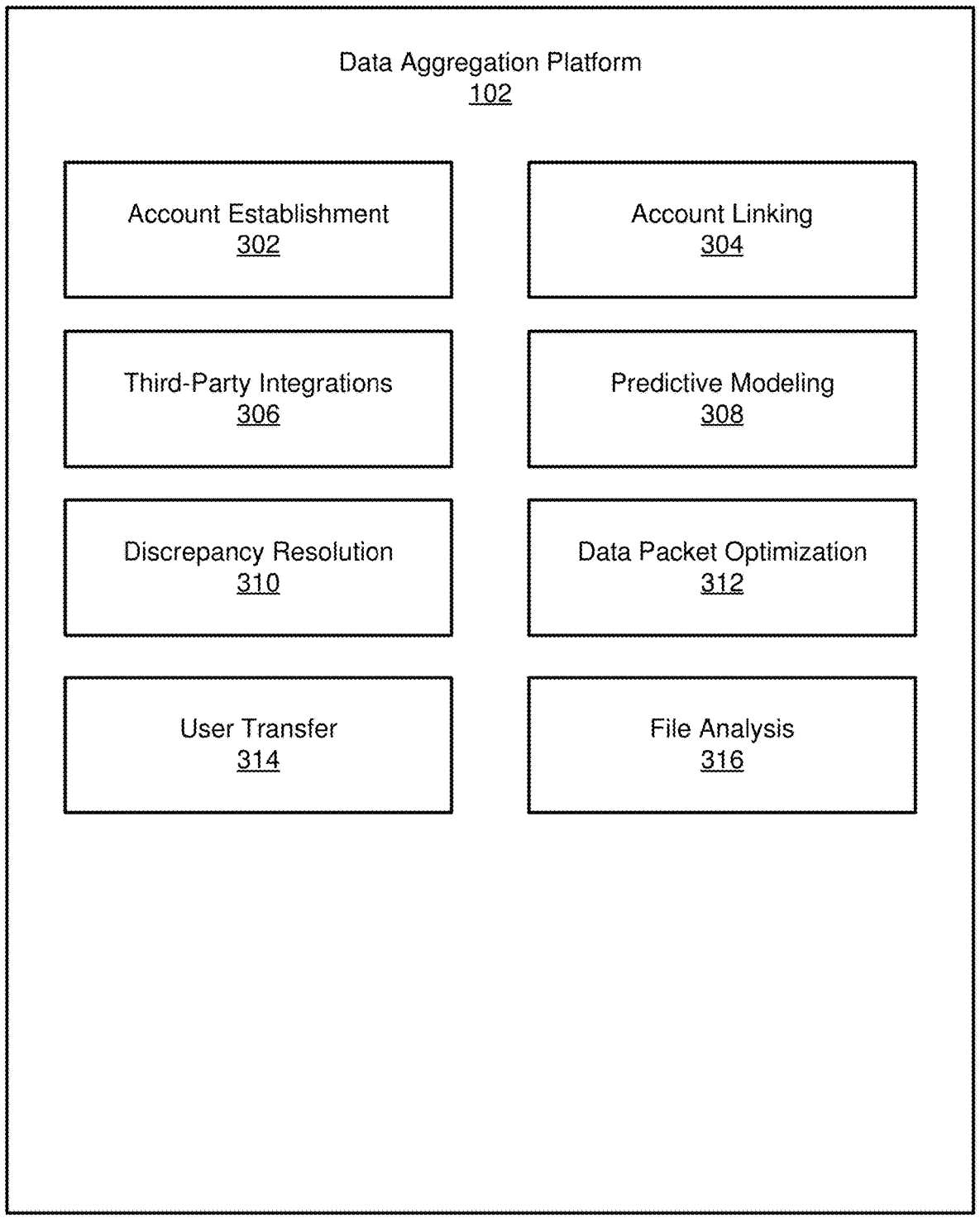
FIG. 3 is a schematic block diagram illustrating components of a data aggregation platform.

FIG. 3 is a schematic block diagram illustrating potential components of the data aggregation platform 102. The data aggregation platform 102 may include, for example, components and algorithms for account establishment 302, account linking 304, third-party integrations 306, predictive modeling 308, discrepancy resolution 310, data packet optimization 312, user transfer 314, and file analysis 316.

The account establishment 302 component is responsible for onboarding accounts within the data aggregation platform 102. Each account may be associated with a unique individual or entity. Different accounts will be assigned different permissions for accessing data stored on the database 112. The accounts may include, for example, administrator accounts with broader permissions to read and write data, and the accounts may include limited user accounts with limited permissions. Depending on the implementation of the data aggregation platform 102, the accounts may be specialized for certain tasks. For example, when the data aggregation platform 102 is implemented for project management, the accounts may include requester/client accounts, contractor accounts, supervisor accounts, employee accounts, management accounts, third-party integrated accounts, and so forth.

The account establishment 302 component generates a new account to be associated with a unique project and/or connects an existing account with the unique project. The data aggregation platform 102 will permit an account to read and/or write data associated with the unique project only if the account has been formally associated with the unique project by the account establishment 302 component.

The account linking 304 component associates accounts with a unique project and associates various datapoints with one another as needed, as explained further below. The account linking 304 component identifies a storage component of the database 112 (such as a table or grouping of tables) that are associated with the unique project. The account linking 304 component assigns permissions to the applicable accounts to access at least a portion of the data stored in the database 112 for the unique project. The account linking 304 component may independently assign read and write permissions to data stored on the database 112 for the unique project.

The account linking 304 component additionally links various datapoints together as needed. In an example implementation, the data aggregation platform 102 is used for managing various construction projects. In this implementation, it may be useful to link employees and/or contractors together to comply with safety protocols. For example, a first employee/contractor may be assigned to operate a piece of equipment and a second employee/contractor may be assigned to spot and monitor the first employee/contractor. In some cases, it may also be useful to link people together in a mentor/mentee relationship and ensure that those people move together when assigned to different jobsites, tasks, and projects. The account linking 304 component ties to individual profiles together and ensures that those two profiles are essentially viewed as one person within the data aggregation platform 102. In this case, the two linked individuals cannot be assigned to different jobsites or projects without first breaking the link and/or reassigning the individuals to different partnerships.

The third-party integrations 306 component establishes secure connections with third-party data sources. The third-party integrations 306 component stores a listing of authorized machines, devices, and accounts (i.e., "whitelisted"). The data aggregation server 104 securely communicates with outside parties by way of secure API access points. The third-party integrations 306 component may be implemented to receive real-time updates from various external parties or sensors. For example, the third-party integrations 306 component may track the real-time geographic location of equipment based on data received from a GPS system or owner of the equipment.

The predictive modeling 308 component analyzes data to identify trends applicable to projects and/or improves workflows executed by the data aggregation server 104. In an implementation, the data aggregation platform 102 presents a project to a machine learning algorithm trained to determine whether required equipment, tools, and supplies will be available for the project currently or in the future and whether sufficient labor will be available for the project currently or in the future.

The predictive modeling 308 component may include an analysis of variance (ANOVA) statistical model. ANOVA is a collection of statistical models and their associated estimation procedures used to analyze the differences among means. ANOVA is based on the law of total variance, where the observed variance in a particular variable is partitioned into components attributable to different sources of variation.

The predictive modeling 308 component may include a long short-term memory (LSTM) artificial neural network architecture. LSTM is an artificial recurrent neural network. Unlike standard feedforward neural networks, LSTM has feedback connection. The LSTM architecture can process single data points (such as images) and can further process sequences of data (such as speech or video). The LSTM architecture includes a cell, an input gate, an output gate, and a forget gate. The cell remembers values over arbitrary time intervals and the three gates regulate the flow of information into and out of the cell.

The predictive modeling 308 may include a recurrent neural network (RNN) architecture. The RNN architecture may be particularly implemented for modeling upcoming procedures and predicting future item usage based on past procedures. The RNN architecture is a class of artificial neural networks where connections between nodes form a directed graph along a temporal sequence. This allows the RNN to exhibit temporal dynamic behavior. RNNs can use an internal state (memory) to process variable length sequences of inputs.

The discrepancy resolution 310 component identifies discrepancies in the data stored on the database 112. The discrepancy resolution 310 component may be configured to identify discrepancies only within a single project. The discrepancy resolution 310 component may communicate with the file analysis 316 component to determine whether data manually input by a user conflicts with information presented in documents that have been uploaded by the user.

The data packet optimization 312 component reduces the size of data packets that must be transmitted to communication devices 106. This may be particularly useful when a user is located in a remote location and does not have cellular or satellite service for an extended period or has limited bandwidth to download content. The data packet optimization 312 component creates a queue of documents and updates that need to be transmitted to a certain user account and received by a communication device 106. The data packet optimization 312 component pares down the queue of documents to reduce the overall amount of data that must be received by the communication device 106.

The user transfer 314 component assigns users (e.g., employees, contractors, craftsman, managers, and so forth) to certain projects, jobsites, and tasks. The user transfer 314 component additionally manages the assignment of equipment and tools to certain users, projects, and jobsites. The process of transferring users, equipment, and tools to different projects, jobsites, and tasks presents a technical problem pertaining to the manipulation and organization of data stored on the database 112.

In an example implementation, the data aggregation platform 102 is leveraged to manage various construction projects across different client accounts. In this implementation, numerous users are associated with the data aggregation platform 102, and these users need to be assigned to certain jobs on a certain date, including the present time and in the future. In some implementations, a user cannot be transferred to a different project until a transfer request has been approved by a manager or administrator. If a user needs to be transferred to a different project, and the user has a currently pending transfer request, then the currently pending transfer request must be rejected or cancelled before the user can be transferred. In some cases, a user should be transferred to another job only after the user has completed their current job.

The aforementioned technical problem is solved through the use of independent tables on the database 112 for each user or job. One table is generated to describe all persons working on a certain job over time. This table is assigned to one job, or one task within a job, and may be referred to herein as the user-job table. This job-user table includes columns indicating the start date and the end date for each user that worked on that job. If the end date is NULL, then the user is still on that job until transferred away. When a user needs to be transferred to a different job, the user transfer 314 component references the table to determine where the user is currently assigned, where the user will be assigned in the future, and when the user will be free. The user transfer 314 component ensures that users are not double-booked across multiple projects or jobsites on one day.

The file analysis 316 component analyzes files uploaded to the database 112 to determine the information depicted in those files. The files may include images, scans, videos, renders of digital documents, digital signatures, and so forth. The file analysis 316 component includes a neural network or machine learning algorithm configured to "read" a document and identify the information depicted in the document. The file analysis 316 component communicates with the discrepancy resolution 310 component to determine whether documents uploaded by an account are consistent with other data that has been manually-input or otherwise ingested for the account.

The file analysis 316 component includes a neural network for analyzing images uploaded to the data aggregation platform 102. The image analysis component performs facial recognition to identify if the same person is depicted in numerous images. The data aggregation platform 102 includes a means for an employee or contractor to "clock in" to work an indicate that they began a shift. The clocking-in process includes requiring the users to take a picture of themselves at the jobsite at the time they are checking in to work. The file analysis 316 component analyzes the check-in photograph to determine whether the person claiming to be clocking in is actually depicted in the photograph, and further to determine whether the person is actually located at the jobsite. The file analysis 316 component may further include analyzing the metadata associated with the photograph to ensure the person is actually located at the GPS coordinates for the jobsite.

Figure 4:
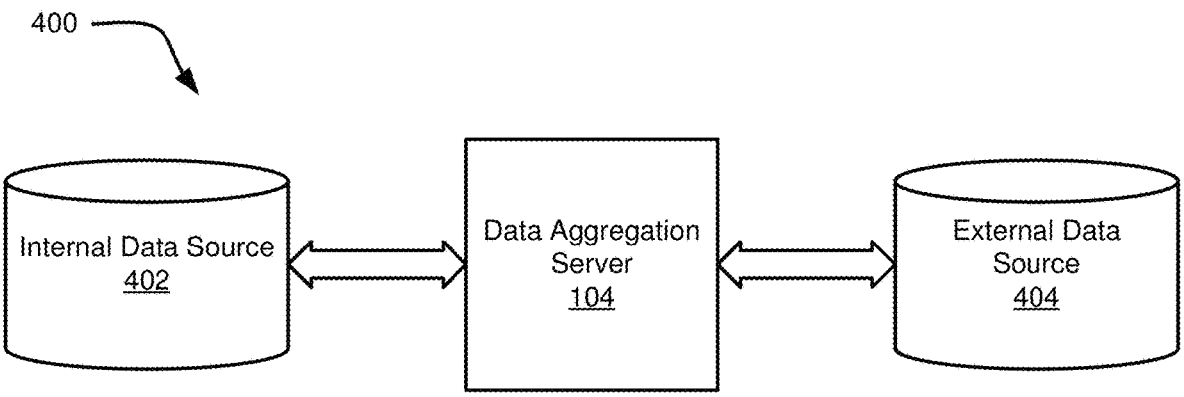
FIG. 4 is a schematic diagram of a system for data communication between a data aggregation server and internal and external data sources.

FIG. 4 is a schematic diagram of a system 400 for data communication between a data aggregation server 104 and internal and external data sources. The data aggregation server 104 may bidirectionally communicate with one or more of an internal data source 402 and an external data source 404. The data aggregation server 104 may receive confidential information, including personal identifying information, from outside sources, including directly from manual user input and from file transfer protocols from outside entities. The data aggregation server 104 may also provide confidential information to outside parties.

In an embodiment, the data aggregation server 104 communicates directly with an external data source 404 that is managed or owned by a third-party entity. The data aggregation server 104 may communicate by way of SSL-encrypted HTTP connections. In an embodiment, the external data source 404 is a relational database, and the data aggregation server 104 communicates with the relational database by way of an Application Program Interface (API).

In an embodiment, the external data source 404 is an encrypted hard drive that has been shared with the data aggregation server 104. In an embodiment, the external data source 404 is a virtual data center, and the data aggregation server 104 access the data on a virtual server after signing in or undergoing some other authentication step.

In an embodiment, the data aggregation server 104 communicates with an internal data source 402 that is not managed by some other third-party entity. The internal data source 402 may include a file that has been downloaded or otherwise received from some third-party entity. After the file has been downloaded, the file can be managed and manipulated by the data aggregation server 104. The internal data source 402 may include an encrypted hard drive that is provided by a third-party.

Figure 5:
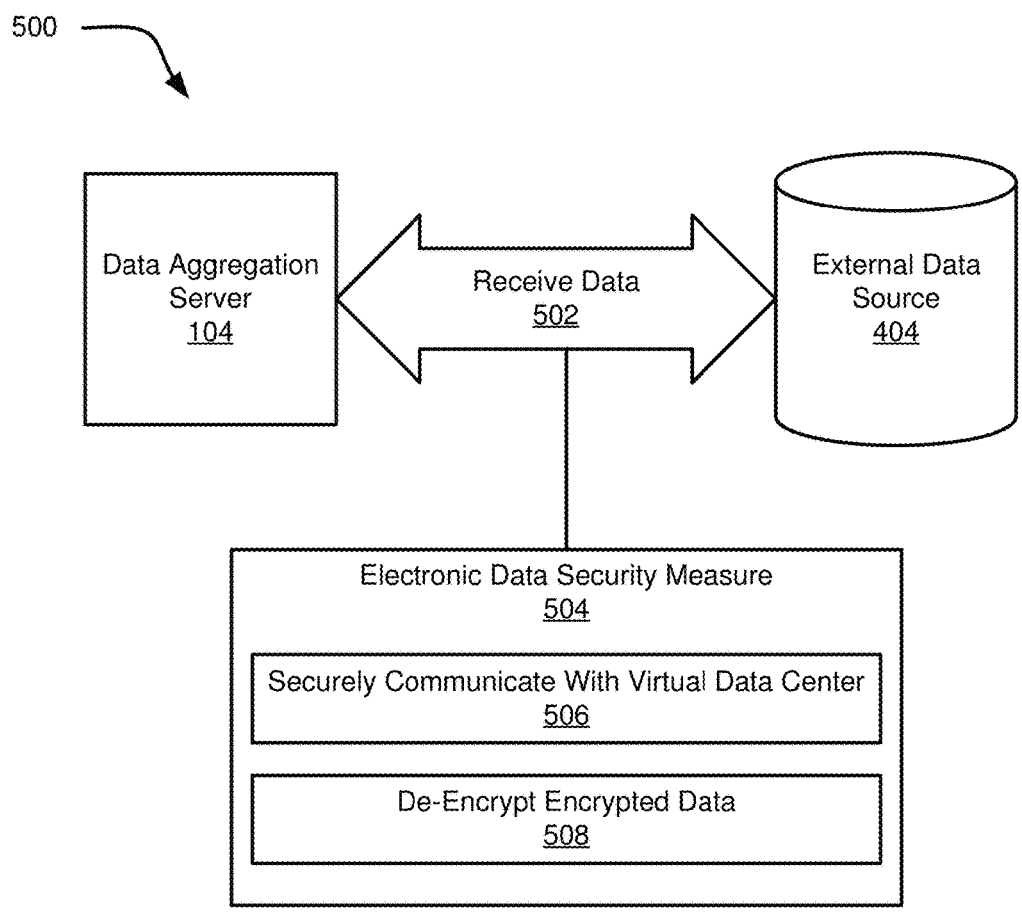
FIG. 5 is a schematic diagram of a system for performing electronic data security measures on data received from an external data source.

FIG. 5 is a schematic diagram of a system and method 500 for performing electronic data security measures on data received from the external data source 404. In some cases, the data may be private or encrypted, such as item-use data for procedures that were performed in the past.

In an embodiment, the data aggregation server 104 receives data 502 by securely communicating with a virtual data center. The protocol for receiving the data 502 from the external data source 404 involves electronic data security measures 504. In an embodiment, an account may be created for a user associated with the data aggregation server 104, and the user could sign into the virtual data center with the account. The user could then access the data stored in the virtual data center by way of the account (see 506). The data may be encrypted or non-encrypted based on the security measures of the virtual data center. In an embodiment, the data may be non-encrypted when viewed by way of a network connection, and the data may be encrypted if downloaded for offline use and manipulation. If the data is downloaded in an encrypted form, then the data must be de-encrypted prior to analysis and manipulation (see 508).

In an embodiment, the data aggregation server 104 receives data by way of an encrypted hard drive. The encrypted hard drive may be provided by the source of the data. In an embodiment, the data aggregation server 104 receives claims data by way of an encrypted file that has been downloaded by way of a network connection. The data aggregation server 104 undergoes an electronic data security measure 404 by de-encrypting the claims data.

Figure 6:
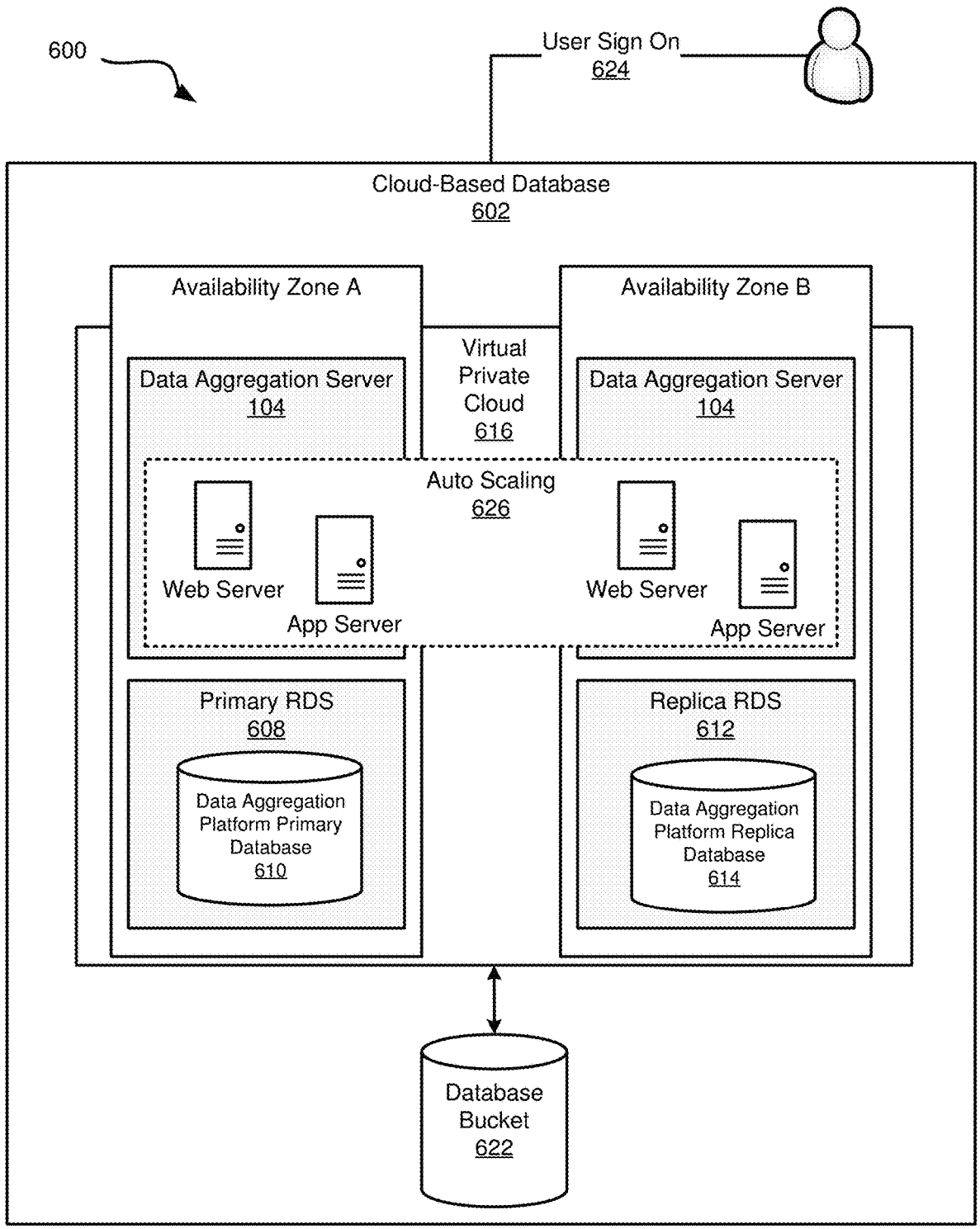
FIG. 6 is a schematic diagram of a system for data storage and analysis on a cloud-based storage system with fault-tolerant servers.

FIG. 6 is a schematic block diagram of a system 600 for data management and security. The system 600 illustrated in FIG. 6 may be implemented in conjunction with the system 100 illustrated in FIG. 1. The system 600 includes a cloud-based database 602 supporting the data aggregation server 104. The cloud-based database 602 includes an Availability Zone A and an Availability Zone B. The Availability Zone A includes a first instance of the data aggregation server 104 and the Availability Zone B includes another instance of the data aggregation server 104. Each of the instances of the data aggregation server 104 includes a web server and an app server, and the cloud-based database 602 auto-scales the processing and storage resources between the web servers and app servers for the Availability Zone A and the Availability Zone B. The Availability Zone A includes a primary relational database service (RDS) 608 and the Availability Zone B includes a replica relational database service 612. The data aggregation platform primary database 610 is stored on the primary relational database service 608 and the data aggregation platform replica database 614 is stored on the replica relational database service 612. The virtual private cloud 616 of the cloud-based database 602 communicates with outside parties by way of Application Program Interfaces 618 and Secure File Transfer Protocol (SFTP) 620 messaging. The cloud-based database 602 includes a database bucket 622 for storing information associated with the data aggregation platform 102. Users interacting the data aggregation platform 102 can sign on 624 to the service by communicating with the cloud-based database 602.

The cloud-based database 602 includes processing and storage resources in communication with the network 110. The cloud-based database 602 includes a resource manager for managing the usage of processing and storage resources. The resource manager of the cloud-based database 602 performs auto scaling 626 load balancing to ensure adequate processing and storage resources are available on demand based on real-time usage.

The availability zones represent discrete datacenters with redundant power, networking, and connectivity for supporting the data aggregation server 104. The availability zones enable the ability to operate production applications and databases in a more highly available, fault tolerant, and scalable way than would be possible with a single datacenter. The Availability Zone A and Availability Zone B are interconnected with high-bandwidth, low-latency networking, over fully redundant, dedicated metro fiber providing high-throughput, low-latency networking between the availability zones. All traffic between the availability zones is encrypted. The network performance of the availability zones is sufficient to accomplish synchronous replication between the availability zones. Applications, modules, components, and processing methods can be partitioned between the availability zones of the cloud-based database 602. When applications are partitioned across the availability zones, the data aggregation server 104 operates with increased protection and isolation from outages that may be caused by a low in power, hardware issues, software issues, and so forth. The availability zones are physically separated by a meaningful geographic distance to ensure the hardware supporting the availability zones will not be impacted by the same outside forces, such as power outages, natural disasters, and so forth.

The virtual private cloud 616 is an on-demand configurable pool of shared resources allocated within the cloud-based database 602. The virtual private cloud 616 provides isolation between different users communicating with the cloud-based database 602, e.g., different facilities, user accounts, and clients in communication with the data aggregation platform 102. The isolation between one virtual private cloud 616 user and all other users of the same cloud is achieved through allocation of a private IP subnet and a virtual communication construction such as a VLAN or a set of encrypted communication channels per user. The virtual private cloud 616 provides isolation between users within the cloud-based database 602 and is accompanied with a VPN function allocated per-user within the virtual private cloud 616. This secures the remote access to the data aggregation platform 102 by way of authentication and encryption. The data aggregation platform 102 is then essential run on a "virtually private" cloud, even if the processing and storage resources are provided by a third-party cloud-based database service, such as Amazon Web Services®.

The auto-scaling 626 is performed by a resource manager of the cloud-based database 602. The resource manager distributes workload between the web servers and the app servers of the various availability zones of the cloud-based database 602. In some cases, one client of the data aggregation platform 102 may consume a large quantity of storage resources and processing resources at a certain time, and the resource manager will allocate different web servers and app servers across the availability zones to ensure the client receives an adequate quantity of storage and processing resources. The auto-scaling 626 is performed in real-time to meet the needs of the data aggregation platform 102.

The primary and secondary relational database services 608, 612 provide a means to access, replicate, query, and write to the data aggregation platform database instances 610, 614. The data aggregation platform primary database 610 may include a copy of data associated with the data aggregation platform 102, such as user login information, user preference data, pharmaceutical inventory data, past purchasing data, current pricing data, pharmaceutical catalogue data, and so forth. The data aggregation platform replica database 614 may include a replica copy of all or some of the data stored on the data aggregation platform primary database 610. The replicated databases provide fault-tolerance and protect the data aggregation platform 102 form becoming inoperative during a power outage, hardware outage, or natural disaster.

The database bucket 622 provides object storage through a web service interface. The database bucket 622 uses scalable storage infrastructure that can be employed to store any type of object. The database bucket 622 may store applications, software code, backup and recovery, disaster recovery, data archives, data lakes for analytics, and hybrid cloud storage to support the data aggregation platform 102.

Figure 7:
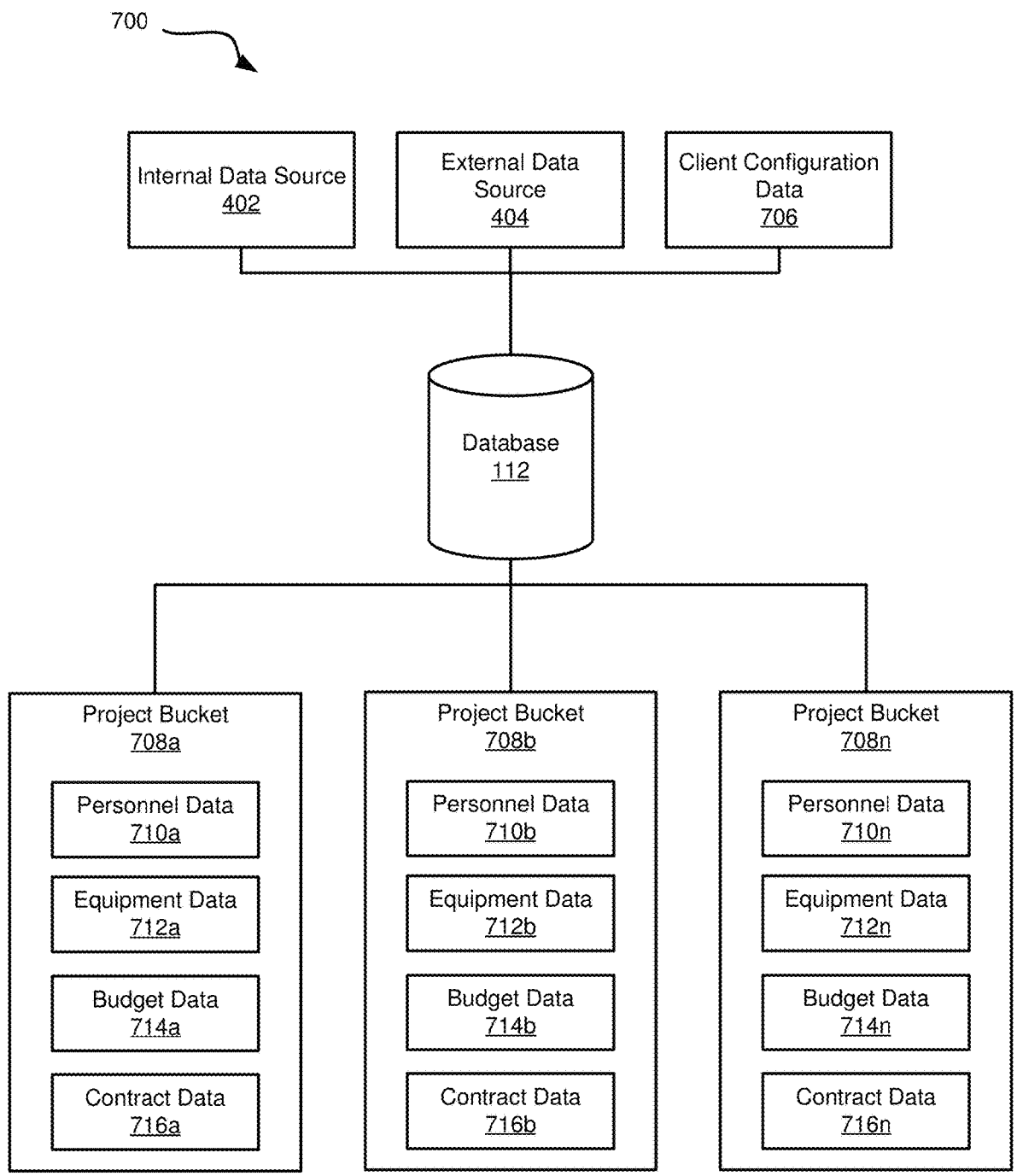
FIG. 7 is a schematic diagram of a system and process flow for aggregating data from a plurality of disparate sources and then assigning the aggregated data to different project buckets on a database.

FIG. 7 is a schematic diagram of a system and process flow 700 for aggregating data from a plurality of disparate sources and then assigning the aggregated data to different project buckets on a database. As described in connection with FIG. 1, data may be retrieved and aggregated from a plurality of different sources, including communication devices 106 associated with both internal data sources 402 (e.g., clients and users of the data aggregation platform 102) and external data sources 404 (e.g., outside entities providing information pertaining to the users of the data aggregation platform 102). Data may additionally be retrieved or scraped from third-party communication clients 108 and data may be output from a neural network 118. The data aggregation server 104 ingests data from a plurality of disparate sources, normalizes the data, and partitions the data into appropriate tables within the database 112.

The database 112 stores data retrieved from internal data sources 402, which may include users of the data aggregation platform 102. The internal data sources 402 may provide user inputs, including, for example, a user creating a new project, a user inputting timecard entries, a user inputting equipment checks or verifications, a user submitting GPS data, and so forth. The database 112 additionally stores data retrieved from external data sources 402, which may include outside entities that are not directly associated with the data aggregation platform 102. External data sources 404 may include, for example, equipment rental companies providing equipment rentals to users associated with the data aggregation platform 102, invoicing or billing companies associated with users of the data aggregation platform 102, customers of the users of the data aggregation platform 102, and so forth. The database 112 also stores client configuration data 706, which may include, for example, manually input client specifications or preferences for how projects, personnel, equipment, tools, and so forth should be managed by each client associated with the data aggregation platform 102.

The database 112 partitions data into different project buckets 708, wherein each project bucket is associated with a project comprising one or more tasks. In an example implementation, a client of the data aggregation platform 102 instructs the data aggregation server 104 to create a project bucket 708 to represent a real-world construction project, such as the construction of a building, highway, installation of public utilities, maintenance of existing utilities, and so forth. The data aggregation server 104 creates a project bucket 708 to be stored on the database 112 to organize all known data associated with the real-world construction project. The project bucket 708 will store a variety of information that is organized in a time-based longitudinal data format. This information may include, for example, personnel data 710, equipment data 712, budget data 714, contract data 716, and so forth.

In the example process flow 700 illustrated in FIG. 7, the database 112 is storing three separate project buckets 708*a*, 708*b*, 708*n*, but it should be appreciated that the database 112 may store any number of project buckets as needed. The first project bucket 708*a* includes personnel data 710*a*, equipment data 712*a*, budget data 714, contract data 716*a*, and so forth. The second project bucket 708*b* stores personnel data 710*b*, equipment data 712*b*, budget data 714*b*, contract data 716*b*, and so forth. Each project budget 708 will store its own copy of unique data.

The various project buckets 708 may be distributed across different bare metal servers which may be located in different geographic regions. In some cases, each project budget 708 is replicated across different physical database resources located in different geographic regions, as discussed in connection with FIG. 6. Each project bucket 708 is associated with at least one client account on the data aggregation platform 102.

The project buckets 708 may be implemented with different database schemas and data formats. In an example implementation, each project bucket 708 is represented in one or more tables on a relational database. In some cases, each project bucket 708 includes multiple independent tables. For example, the project bucket 708 may include a primary table that maps to multiple dependent tables, including, for example, independent dependent tables for the personnel data 710, equipment data 712, budget data 714, contract data 716, and so forth.

The database 112 manages permissions for each project bucket 708 and for the data stored on each project bucket. Different users of the data aggregation platform 102 will have different read and write permissions for different types of data. In an example implementation, a supervisor on a construction job has broad read and write permissions to view and amend various types of data stored within a first project bucket 708 associated with a first project but has zero read and write permissions for data stored on a second project bucket 708 associated with a second project. Further to the example implementation, a worker or contractor reporting into the supervisor may have highly limited read and write permissions within the project bucket 708. The worker may be allowed to read data associated with schedules, contracts, timelines, equipment, and so forth associated with the project, but may have highly restricted "write" access to changing the data stored in the project bucket 708.

Figure 8:
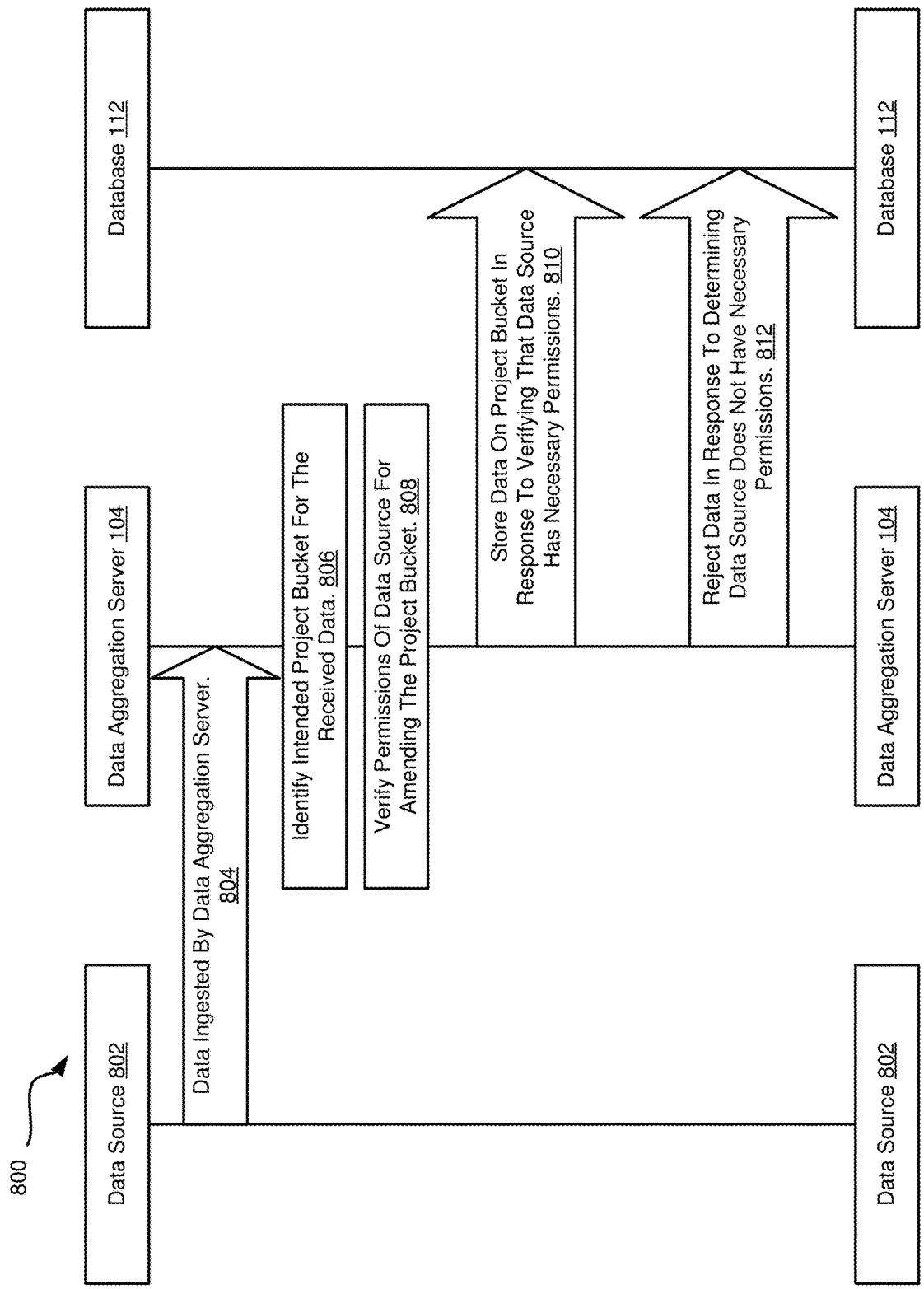
FIG. 8 is a schematic diagram of a process flow for receiving and authenticating data to be stored on a database.

FIG. 8 is a schematic flow chart diagram of a process flow 800 for ingesting and authenticating data associated with a data bucket 708 on the database 112. The process flow 800 is implemented by a data sources 802, such as an internal data source 402 or an external data source 404. The process flow 800 is further implemented by the data aggregation server 104 in connection with the database 112.

The process flow 800 begins and the data source 802 provides data to the data aggregation server 104 by way of the data aggregation platform 102 or some other means. The data aggregation server 104 ingests the data at 804. The data aggregation server 104 identifies an intended project bucket 708 for the received data at 806. The data aggregation server 104 verifies permissions of the data source for amending the project bucket 708 and 808. The data aggregation server 104 then stores the data within the project bucket 708 in response to verifying that the data source 802 has necessary permissions at 810. Alternatively, the data aggregation server 104 rejects the data in response to determining the data source 802 does not have the necessary permissions to write to the project bucket 708 at 812.

Figure 9:
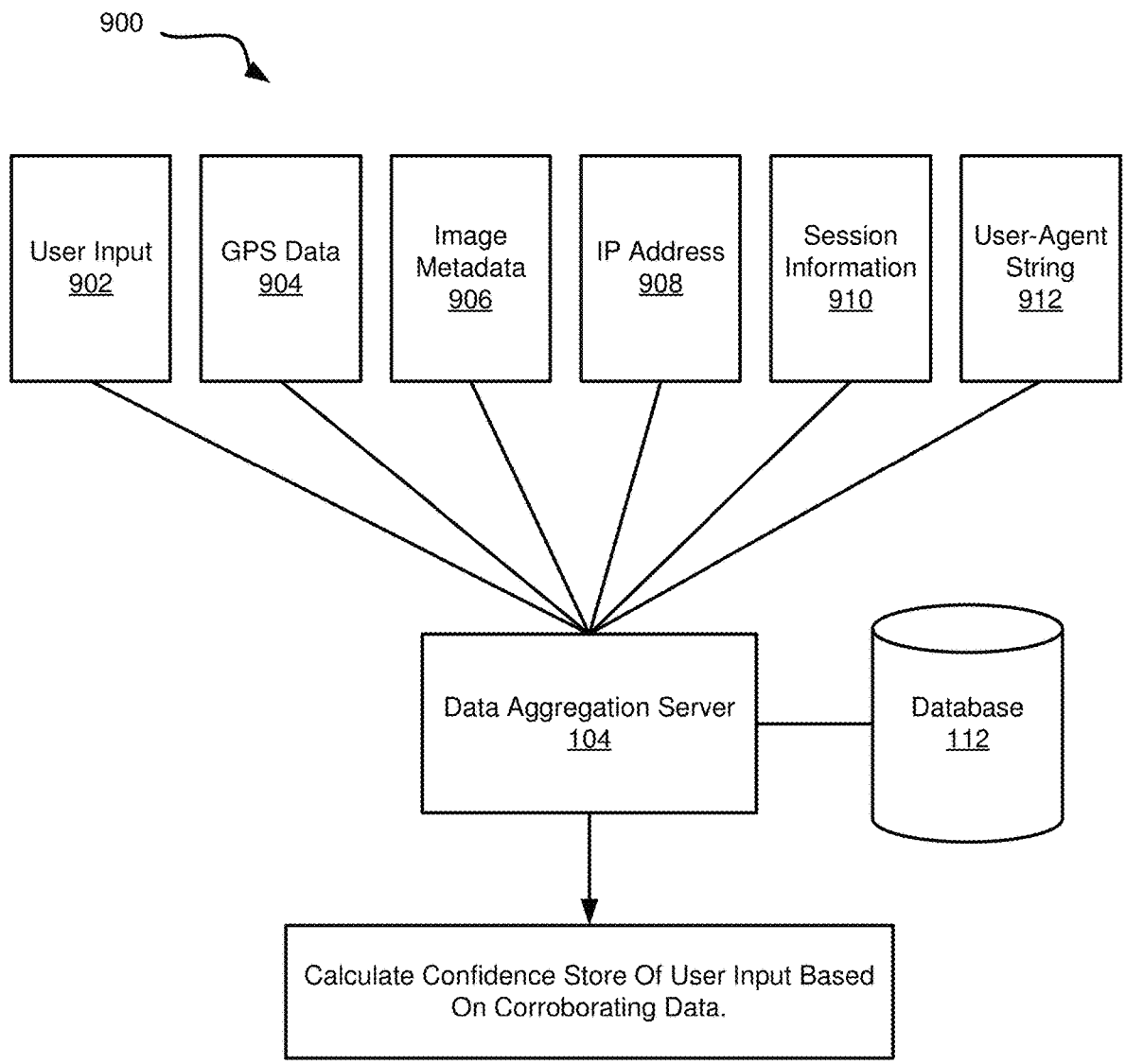
FIG. 9 is a schematic diagram of an example data ingestion scheme.

FIG. 9 is a schematic block diagram of an example data ingestion scheme 900 for the data aggregation server 104. The data aggregation server 104 is configured to calculate a confidence score for data inputs. The confidence score provides a means for determining whether a certain data point is likely true or may require further investigation. This may be particularly useful when seeking to verify the authenticity of a worker's time entry, an equipment inspection report, whether equipment was returned or properly cared for, whether a task was actually completed, and so forth.

The data aggregation server 104 receives a plurality of data points that are all associated with a single data event. In an example implementation, the "data event" includes a contractor implementing a time clock entry indicating they worked a certain number of hours on a project. This single data even includes multiple data points, including, for example, the actual user input 902 from the worker, GPS data 904 of the worker's phone or equipment when the user input 902 was submitted, image metadata 906 associated with an image submitted by the user, an IP address 908 of the user's device, session information 910 associated with the user input 902, user-agent string 912 information associated with the user input 902, and so forth. The data aggregation server 104 stores the plurality of data points on the database 112 in a manner that matches the plurality of data points to a single data event. In some cases, the data aggregation server 104 stores the plurality of data points on a single row within a table on the database 112, wherein the single row includes a different column representing the different types of data points 902-912.

The data aggregation server 104 calculates a confidence score for the correctness of the user input 902 (or some other data point) based on the accumulation of data associated with the data event. In some cases, the additional data points 904-912 are viewed as corroborating data for determining whether the user input 902 is correct. The confidence score is calculated based on several metadata points pertaining to the user input 902. In the case of an employee clock-in, there may be several data points baked into the confidence score, such as whether the employee submitted a photo, whether the photo depicts the person clocking in, whether the location for the photo is in close proximity to the task they are clocking in for, whether the photo was submitted through the correct user login, and so forth.

Figure 10:
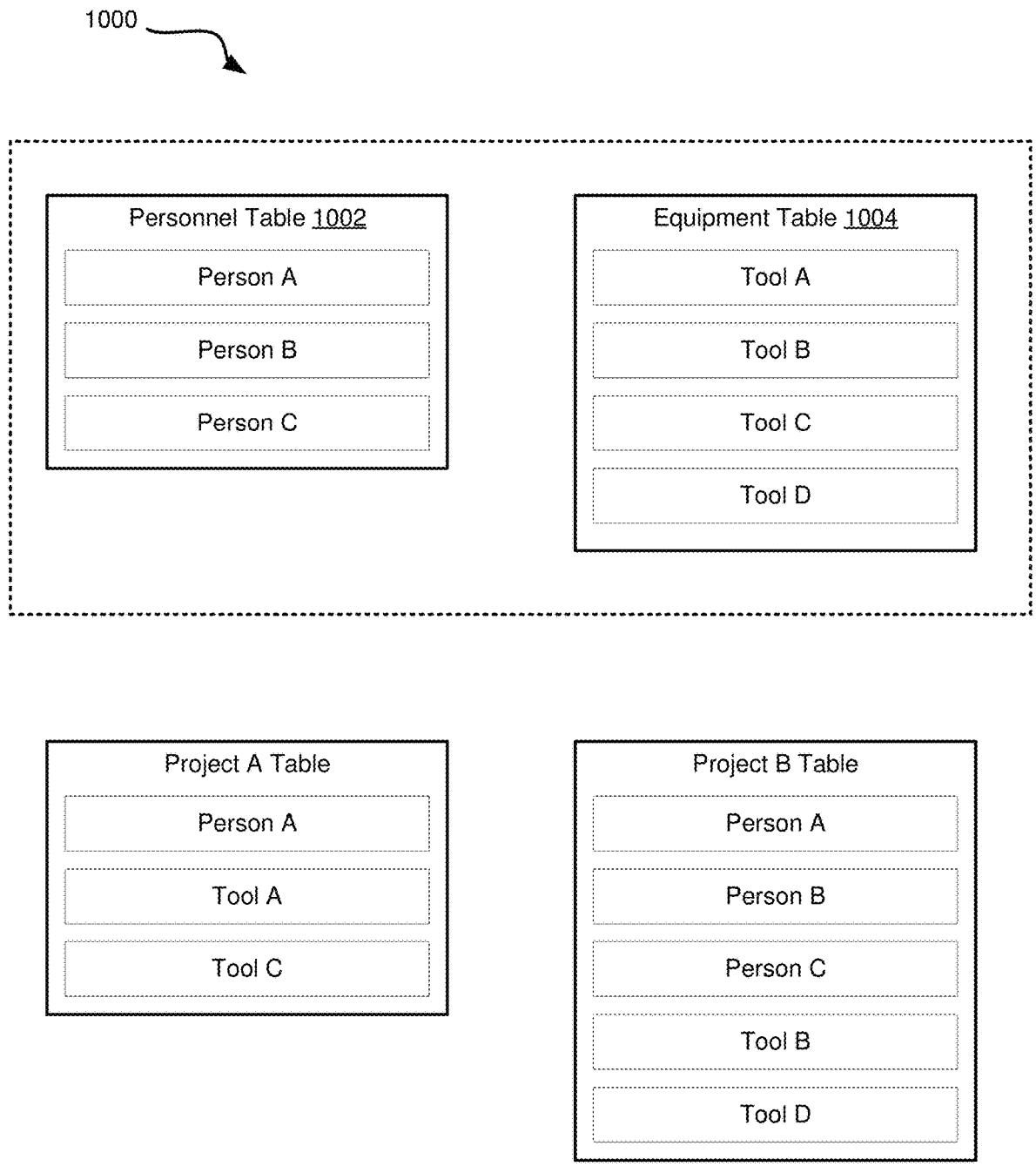
FIG. 10 is a schematic diagram of an example data scheme for linking or matching data within a database.

FIG. 10 is a schematic block diagram of an example data scheme 1000 for linking or matching data within the data aggregation platform 102. The data scheme 1000 may be particularly useful when seeking to link two or more workers together, link equipment to a worker, link equipment to a task or jobsite, link business locations to certain equipment, link workers to job site, and so forth.

The data scheme 1000 represents a polymorphic data model. The data scheme 1000 is used when a single entity requires different functionality or information. As described herein, the polymorphic data model may be implemented as an ad hoc polymorphism model, a parametric polymorphism model, or a subtyping model. In some implementations, the polymorphic data model is implemented as row polymorphism within a relational database modeling pattern, but this is not required.

The example data scheme 1000 represented in FIG. 10 includes separate tables for storing different types of data points. For example, the data scheme 1000 may include a personnel table 1002 that exclusively stores information about different workers, contractors, employees, managers, and so forth. The data scheme 1000 may additionally include an equipment table 1004 that exclusively stores information about different tools, equipment, vehicles, and so forth. The data scheme 1000 may have any number of tables as needed, and the tables may be highly granular (e.g., separate tables for contractors, employees, managers, and so forth, rather than all personnel within a single table). The example data scheme 1000 maps the primary-level information (see data within personnel table 1002 and equipment table 1004) to secondary tables, such as the project A table and the project B table. The project tables may represent project buckets 708 as discussed herein. The project tables include mappings to data points stored within the primary tables 1002, 1004. For example, the table for project A indicates that the corresponding project is associated with Peron A identified in the personal table 1002 and Tool A and Tool C identified in the equipment table 1004.

Figure 11:
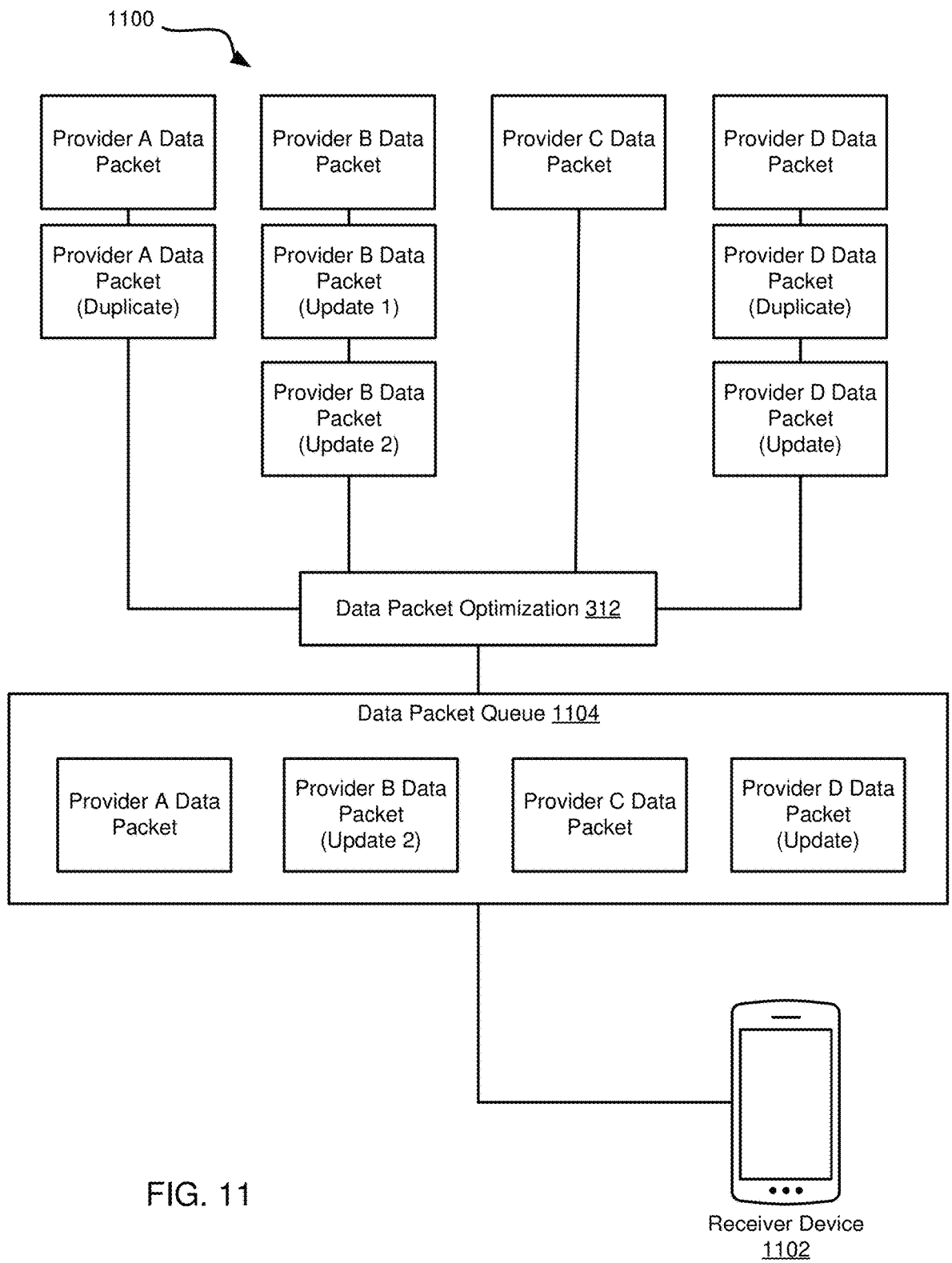
FIG. 11 is a schematic diagram of a system and process flow for prioritizing data presented in a data packet queue.

FIG. 11 is a schematic diagram of a system and process flow 1100 for prioritizing data presented in a data packet queue 1104. The process flow 1100 may be implemented when the receiver device 1102 is offline and cannot communicate with the data aggregation server 104. The data packet optimization 312 component may thereby fill the data packet queue 1104 while the receiver device 1102 is offline such that the receiver device 1102 can download the data within the data packet queue 1104 when it regains communication with the data aggregation server 104.

The data packet optimization 312 component minimizes the size of data within the data packet queue 1104. This is particularly helpful if the receiver device 1102 regains communication with the data aggregation server 104 but continues to have an unreliable or slow network connection. The data aggregation server 104 comprises a listener on device network status that determines whether the receiver device 1102 is currently online or offline. When the receiver device 1102 goes offline, the listener notifies the data packet optimization 312 component and the data packet queue 1104 if generated.

The process flow 1100 illustrates an example implementation wherein the data packet component 312 of the data aggregation platform 102 receives data from four providers, including Provider A, Provider B, Provider C, And Provider D. It should be appreciated that the data aggregation platform 102 may receive data from any number of providers depending on the implementation. The data illustrated in FIG. 11 is intended to be seen and/or downloaded by a user connected to the receiver device 1102. The process flow 1100 may be particularly useful where the receiver device 1102 is out-of-range and cannot be reached for an extended period of time. This may occur when the receiver device 1102 cannot connect to the network 110.

The data packet component 312 receives two data packets from Provider A, including Provider A Data Packet And Provider A Duplicate Data Packet. The data packet component 312 receives three data packets from Provider B, including Provider B Data Packet, Provider B First Updated Data Packet, and Provider B Second Updated Data Packet.

The data packet component 312 receives one data packet from Provider C. The data packet component 312 receives three data packets from Provider D, including Provider D Data Packet, Provider D Duplicate Data Packet, and Provider D Updated Data Packet.

The data packet component 312 identifies and discards duplicate data packets. The data packet component 312 identifies a duplicate data packet based on the originator (provider) of the data packet and further based on the contents of the data packet. Duplicate data packets are not added to the data packet queue 1104. When the data aggregation server 104 receives a new data packet, the data packet optimization 312 component identifies where the new data packet came from based on the provider endpoint URL. For example, the data packet optimization 312 component knows that the Provider A Data Packet and the Provider A Duplicate Data Packet are each sent by Provider A because they each include the same endpoint URL associated with Provider A.

The data packet component 312 prioritizes updated data packets and discards the earlier-received data packets that are rendered obsolete by the update. The data packet component 312 identifies an updated data packet based on the originator (provider) of the data packet and further based on the contents of the data packet. The data packet component 312 adds only the most recently updated data packet to the data packet queue 1104.

In the example illustrated in FIG. 11, the data packet queue 1104 includes only the Provider A Data Packet, The Updated Provider B Data Packet, The Provider C Data Packet, and The Updated Provider D Data Packet. The data packet queue 1104 reduces the size of the data to be received and downloaded by the receiver device 1102 by discarding duplicate and obsolete data packets.

Figure 12:
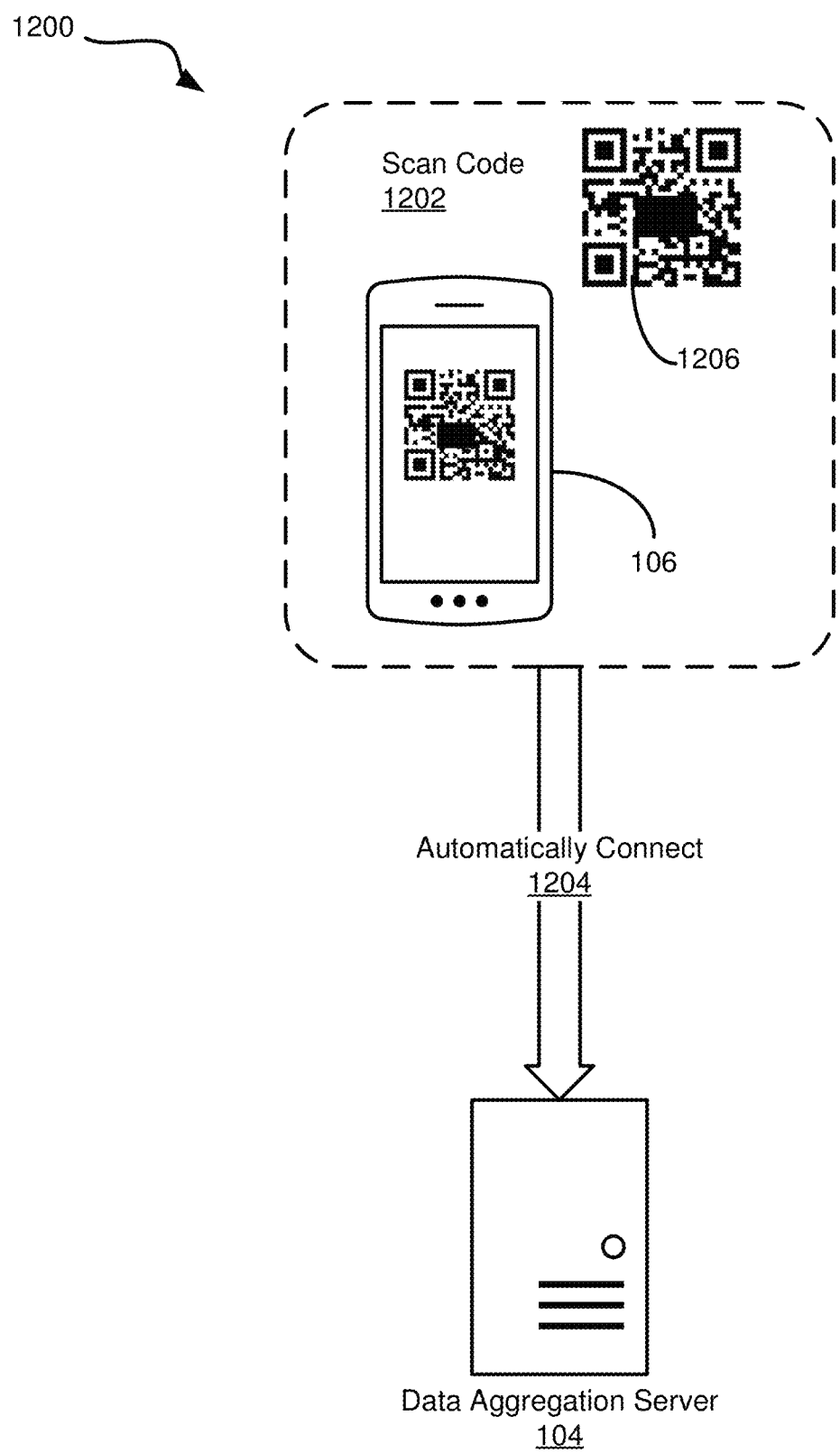
FIG. 12 is a schematic diagram of a system for connecting a device to the data aggregation server.

FIG. 12 is a schematic diagram of a system 1200 for connecting a device to the data aggregation server 104. In an embodiment, a unique code 1206 is provided and a communication device 106 can scan the code (see 1202) to automatically connect (see 1204) to the data aggregation server 104. The unique code 1206 may be any scannable figure or code that is readable by the communication device 106. In an embodiment, the unique code 1206 is a two-dimensional barcode such as a quick response (QR) code. The two-dimensional barcode can be digitally scanned by a camera or other sensor on the communication device 106. The unique code 1206 may include multiple squares that can be read by the image sensor of the communication device 106.

In an embodiment wherein the unique code 1206 is a QR code, the code includes three large squares (the three large squares can be seen in the upper-left, lower-left, and upper-right corners of the example unique code 1206 shown in FIG. 12) that serve as alignment targets while a smaller square in a remaining corner of the unique code 1206 (the smaller square can be seen near the lower-right corner of the example unique code 1206 shown in FIG. 12) serves to normalize the angle with which the image sensor hits the unique code 1206. The remaining area of the unique code 1206 is the actual data that is converted into binary code by the communication device 106. The unique code 1206 may include many characters worth of data. In an example where the unique code 1206 is a 117-pixel square, the code may hold 1852 characters of data.

In an embodiment, an image sensor of the communication device 106 is directed to scan at 1202 the unique code 1206, and the unique code 1206 includes instructions for the communication device 106 to automatically connect to the data aggregation server 104. A processor of the communication device 106 may execute the instructions stored in the unique code 1206 to automatically connect 1204 to the data aggregation server 104. In various implementations, the communication device 106 may request permission from a user and/or query the user whether the communication device 106 should connect to the data aggregation server 104. In an embodiment, automatically connecting 1204 to the data aggregation server 104 brings the media platform 102 up on the communication device 106 in an application, program, webpage, or by some other suitable means.

The unique code 1206 may be associated with certain equipment, tools, job sites, employee or contractor identifiers, or projects. The unique code 1206 may provide instructions to access a webpage comprising information about the item on which the code is displayed.

In some cases, the unique code 1206 is printed upon or adhered to equipment. In these cases, when a user scans 1202 the unique code 1206, the user is directed to a page to view information about the equipment, check in with the equipment, respond to a safety check or inspection for the equipment, view rental or purchase agreements for the equipment, assign or reassign the equipment to another individual or entity, and so forth. The unique code 1206 may provide instructions to access a webpage comprising information about the item on which the code is displayed. In some cases, the webpage to provide inspection or check-in information for the equipment can only be accessed upon scanning the unique code 1206. This may be implemented to ensure the user is actually standing near the equipment when submitting the inspection or check-in information.

In some cases, the unique code 1206 is printed upon or adhered to a grouping of tools, and each of the individual tools within the grouping is associated with the unique code 1206. In these cases, the unique code 1206 may be assigned to a table in the database 112 that describes a listing of each tool within the grouping. In these cases, when a user scans the unique code 1206, the user can view a listing of all tools that should be included within the grouping and may identify which tools needs to be replaced or repaired.

Figure 13A:
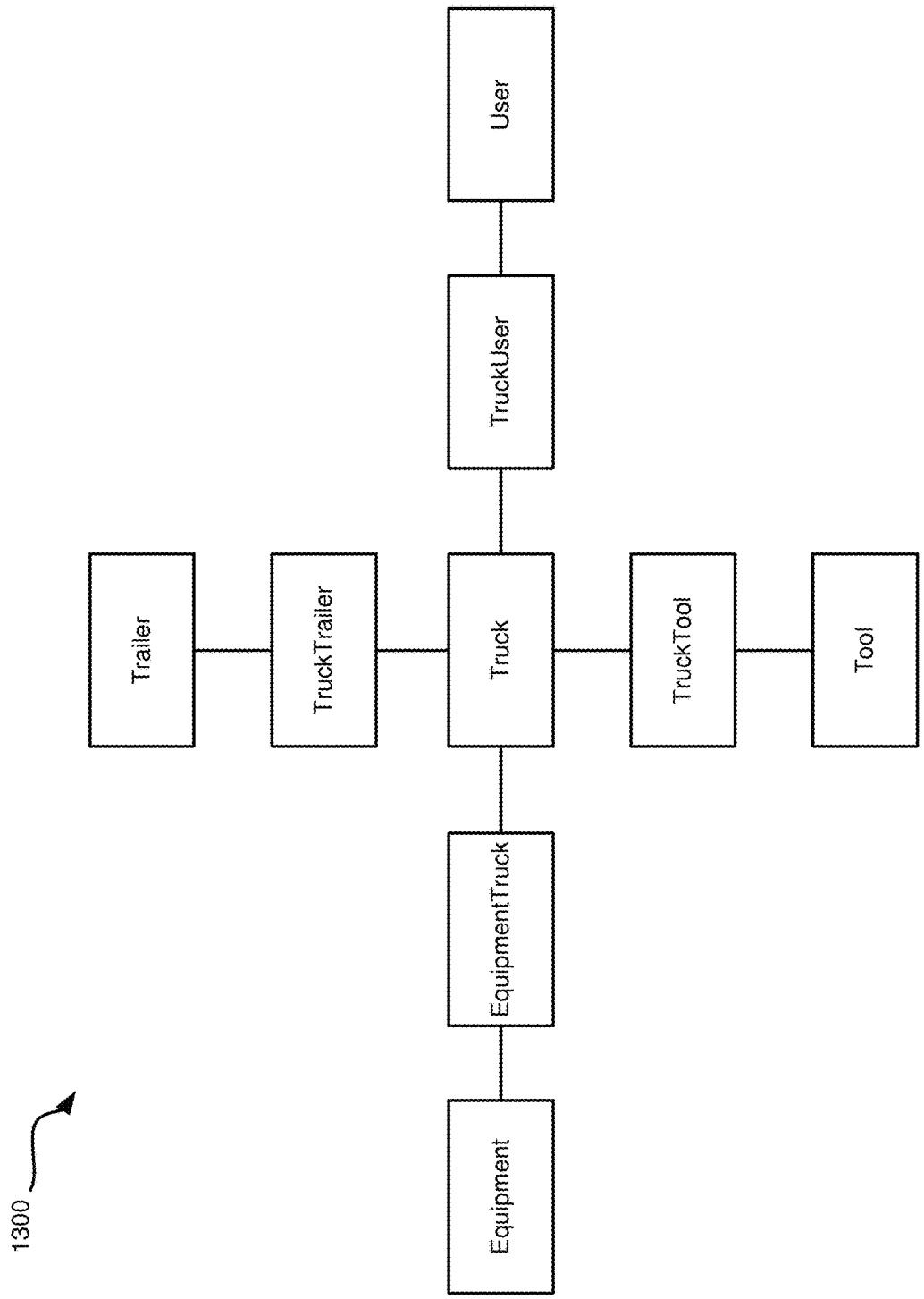
FIGS. 13A-13D are schematic block diagrams of example data schemas implemented for asset assignment.
Figure 13B:
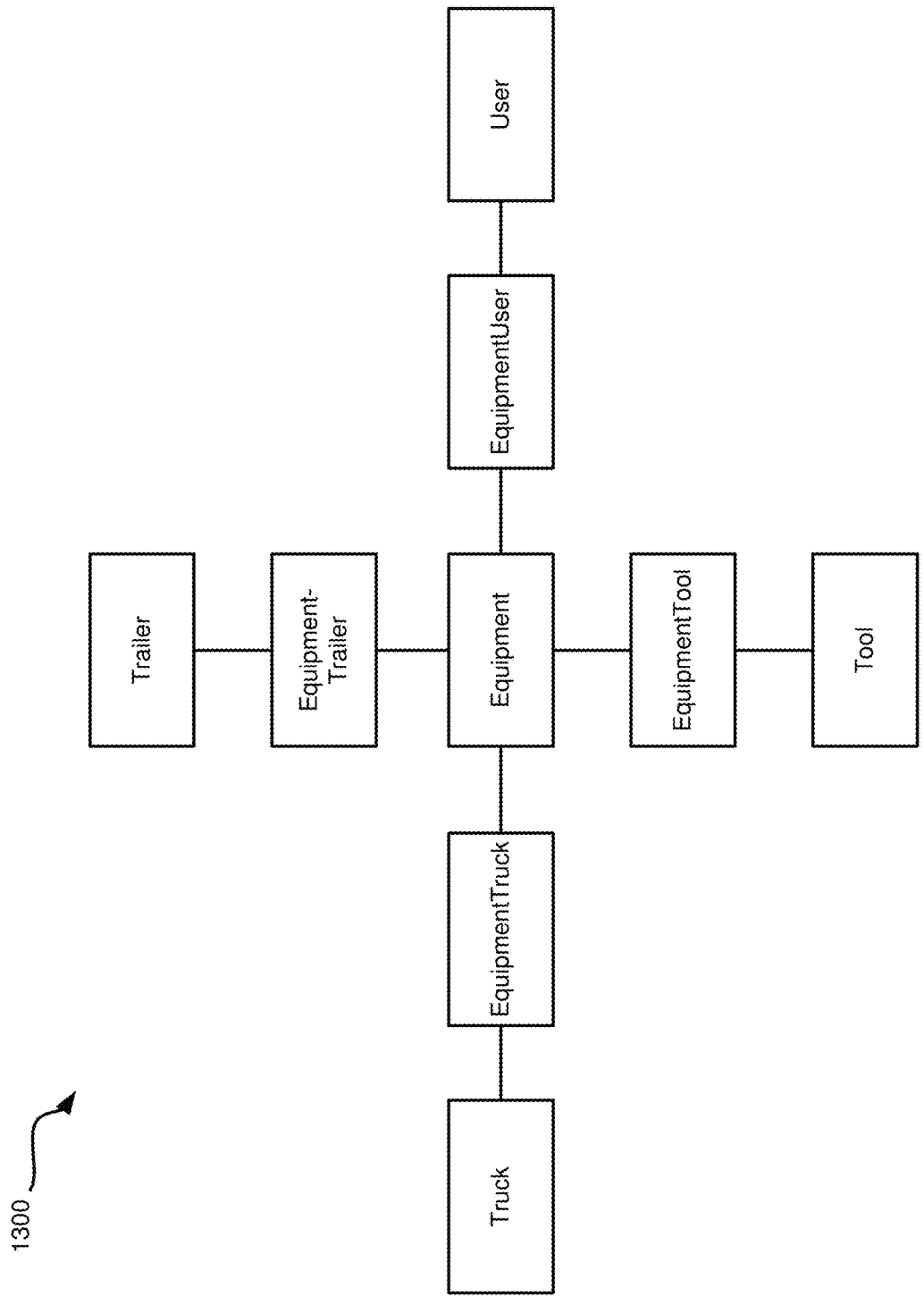
Figure 13C:
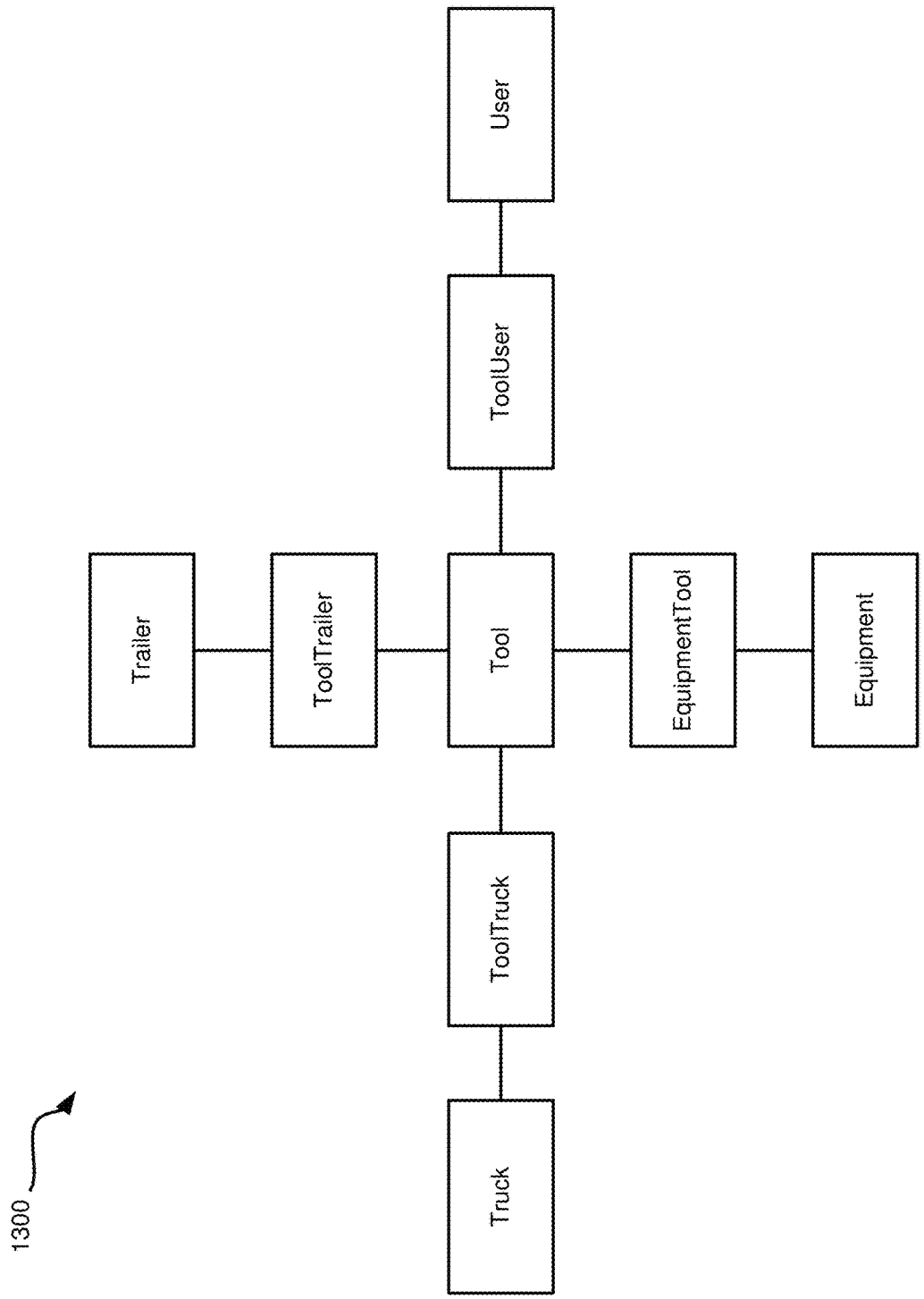
Figure 13D:
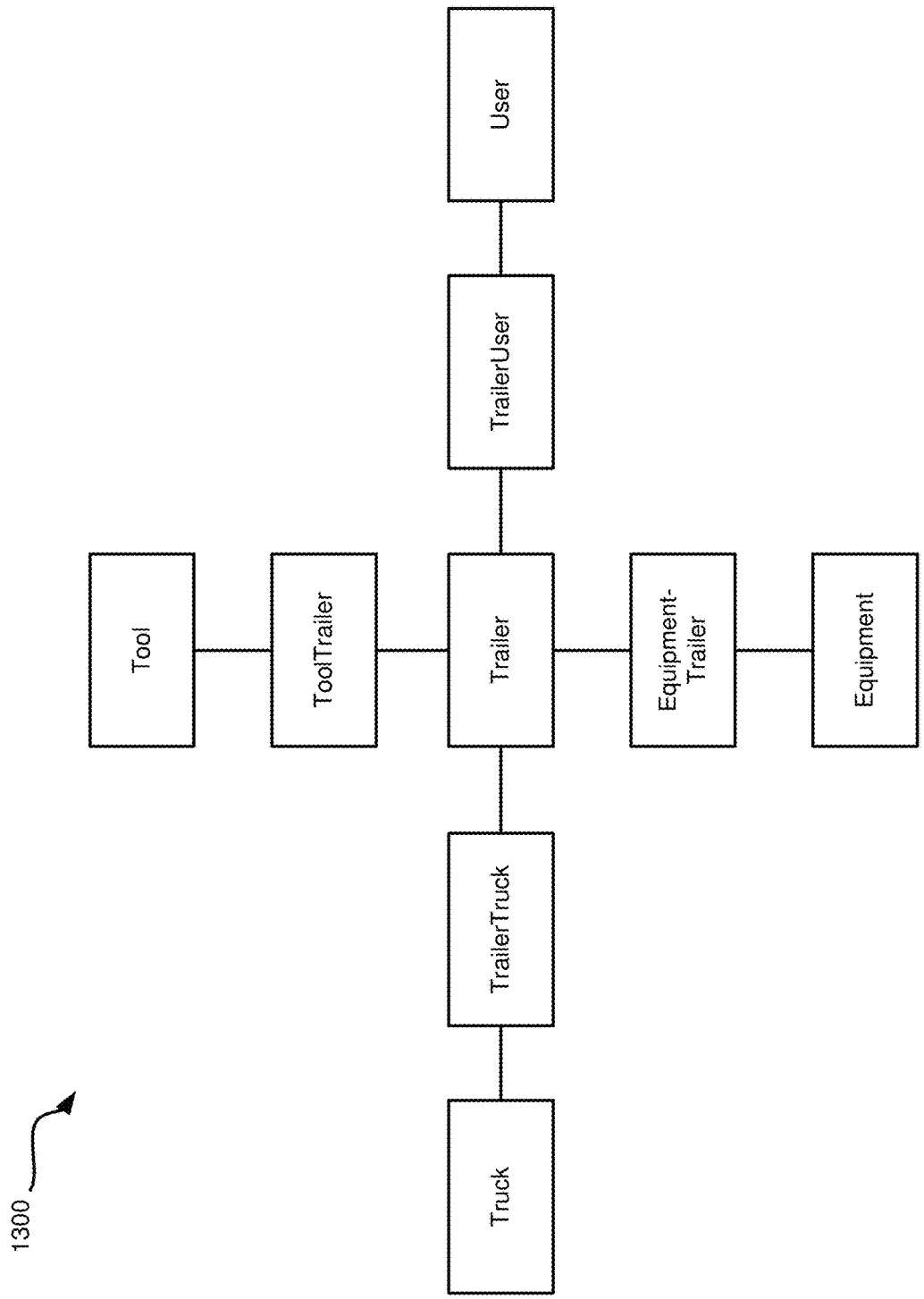

FIGS. 13A-13D are schematic diagrams of example data organization schemas 1300 for the database 112. The schemas illustrated in FIGS. 13A-13D may be specifically implemented when the data aggregation platform 102 is leveraged for project management applicable to construction and building projects. These figures illustrate nesting relationships for an asset. For example, FIG. 13A illustrates that a trailer may be assigned to a truck, and that truck may be assigned to a user, and so forth.

Figure 14:
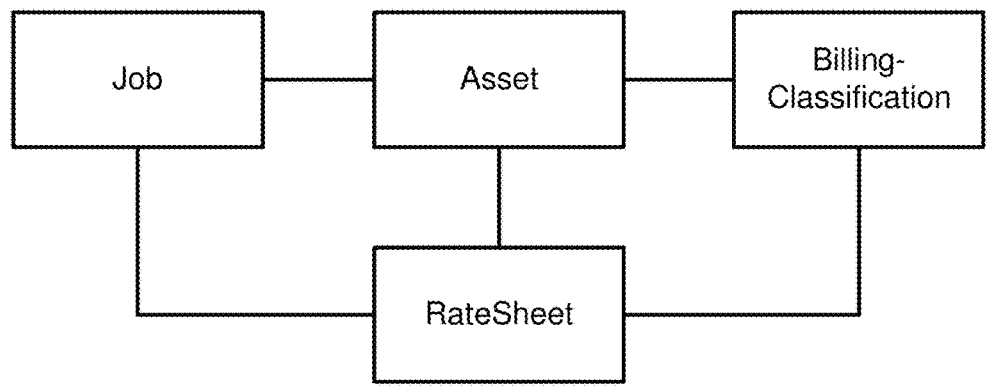
FIG. 14 is a schematic block diagram of an example data schema for billing classification rates.

FIG. 14 is a schematic diagram of an example schema 1400 for organizing tables on the database 112. The example schema 1400 illustrates that an asset may have its own billing rate, and thus if the asset is specifically assigned to a job, then the billing rate for that asset should apply to the job as well.

Figure 15:
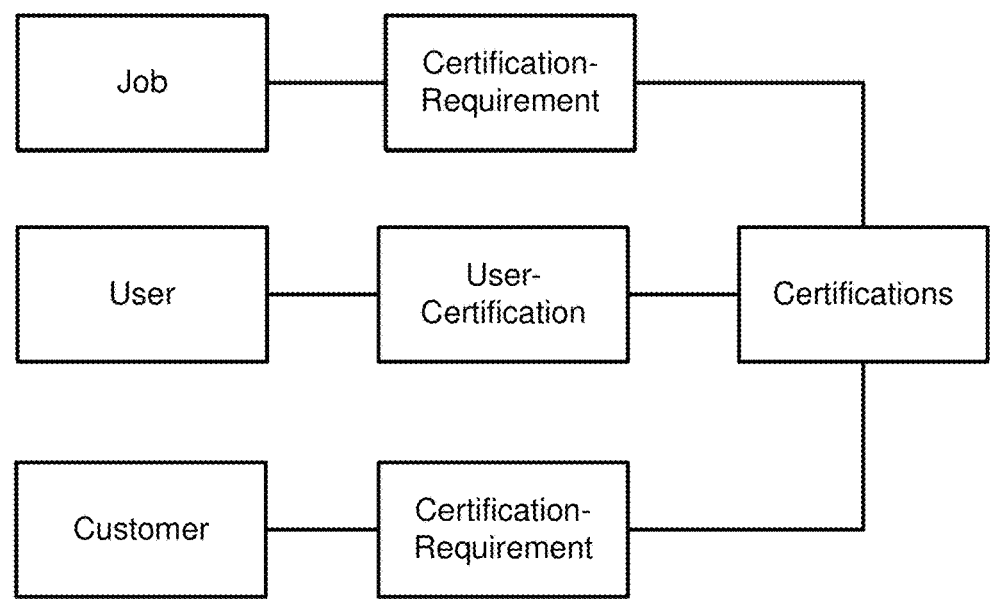
FIG. 15 is a schematic block diagram of an example data schema for certification requirements.

FIG. 15 is a schematic diagram of an example schema 1500 for organizing tables on the database 112. The example schema 1500 specifically illustrates a way to check if certifications for a job are met by an individual or an organization.

Figure 16:
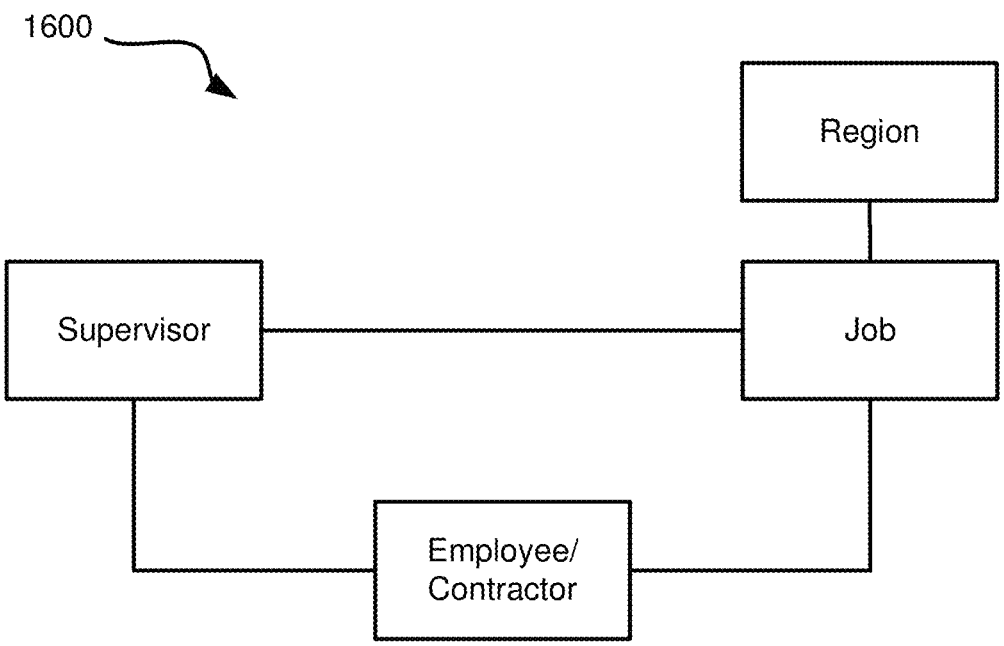
FIG. 16 is a schematic block diagram of an example data schema for user grouping.

FIG. 16 is a schematic diagram of an example schema 1600 for organizing tables on the database 112. The example schema 1600 specifically illustrates how a larger organization with region-specific employees and jobs will only be showing those region-specific things to relevant supervisors and employees.

Figure 17:
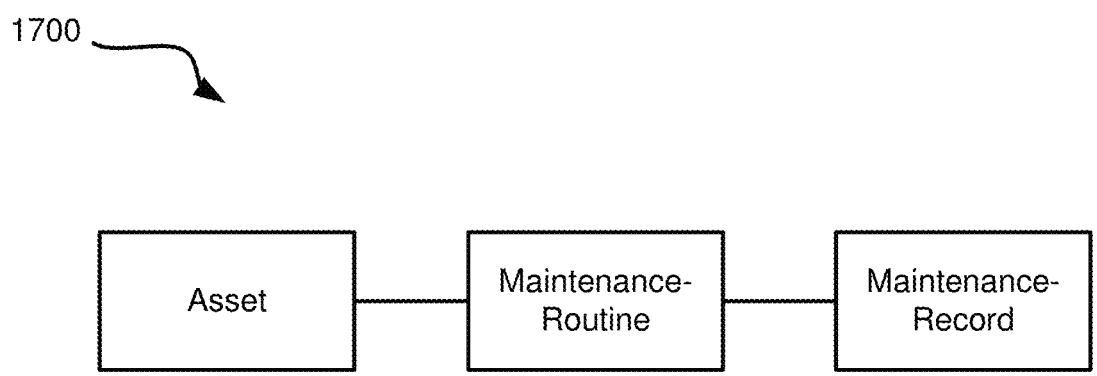
FIG. 17 is a schematic block diagram of an example data schema for maintenance routines.

FIG. 17 is a schematic diagram of an example schema 1700 for organizing tables on the database 112. The example schema 1700 specifically illustrates that an asset may have its own maintenance routing, and this maintenance route would be recorded within an asset history.

Figure 18:
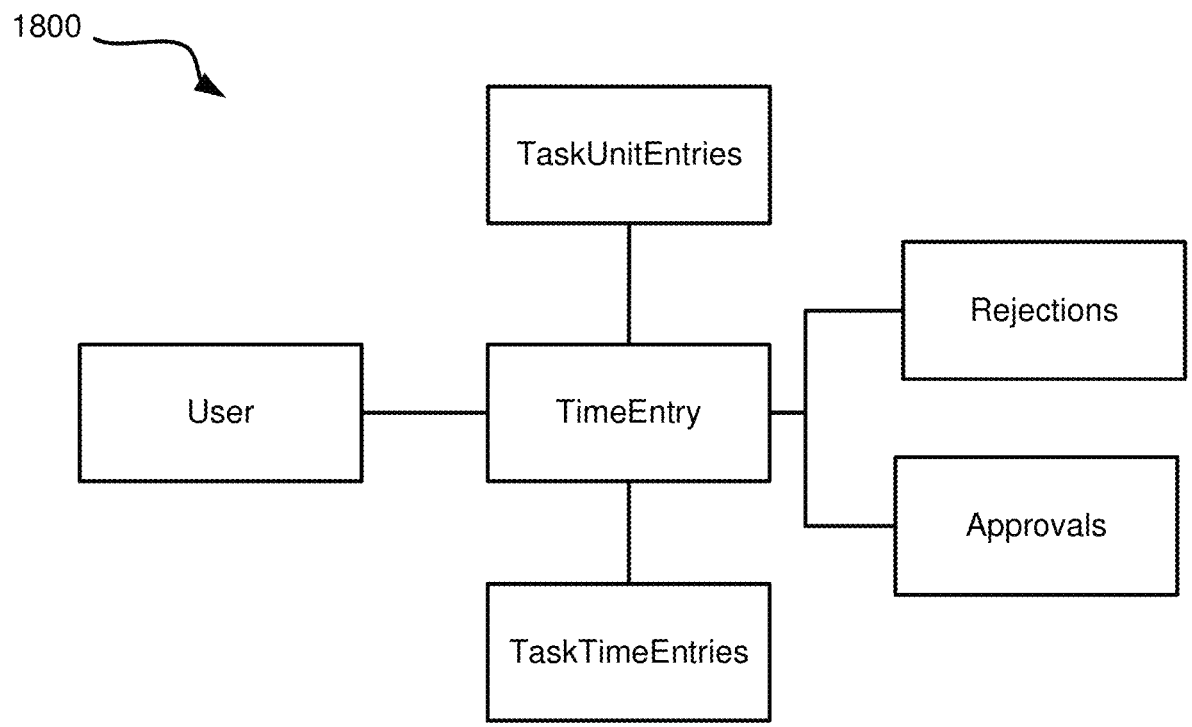
FIG. 18 is a schematic block diagram of an example data schema for time entries.

FIG. 18 is a schematic diagram of an example schema 1800 for organizing tables on the database 112. The example schema 1800 specifically illustrates that a user will be associated with time entries. If time entry hours are tracked in the context of a task, the system may see that the individual worked a different quantity of hours for different tasks. These time entries may require approval by a supervisor, and conversely, may be rejected if they are inaccurately reported or insufficient in some way.

Figure 19:
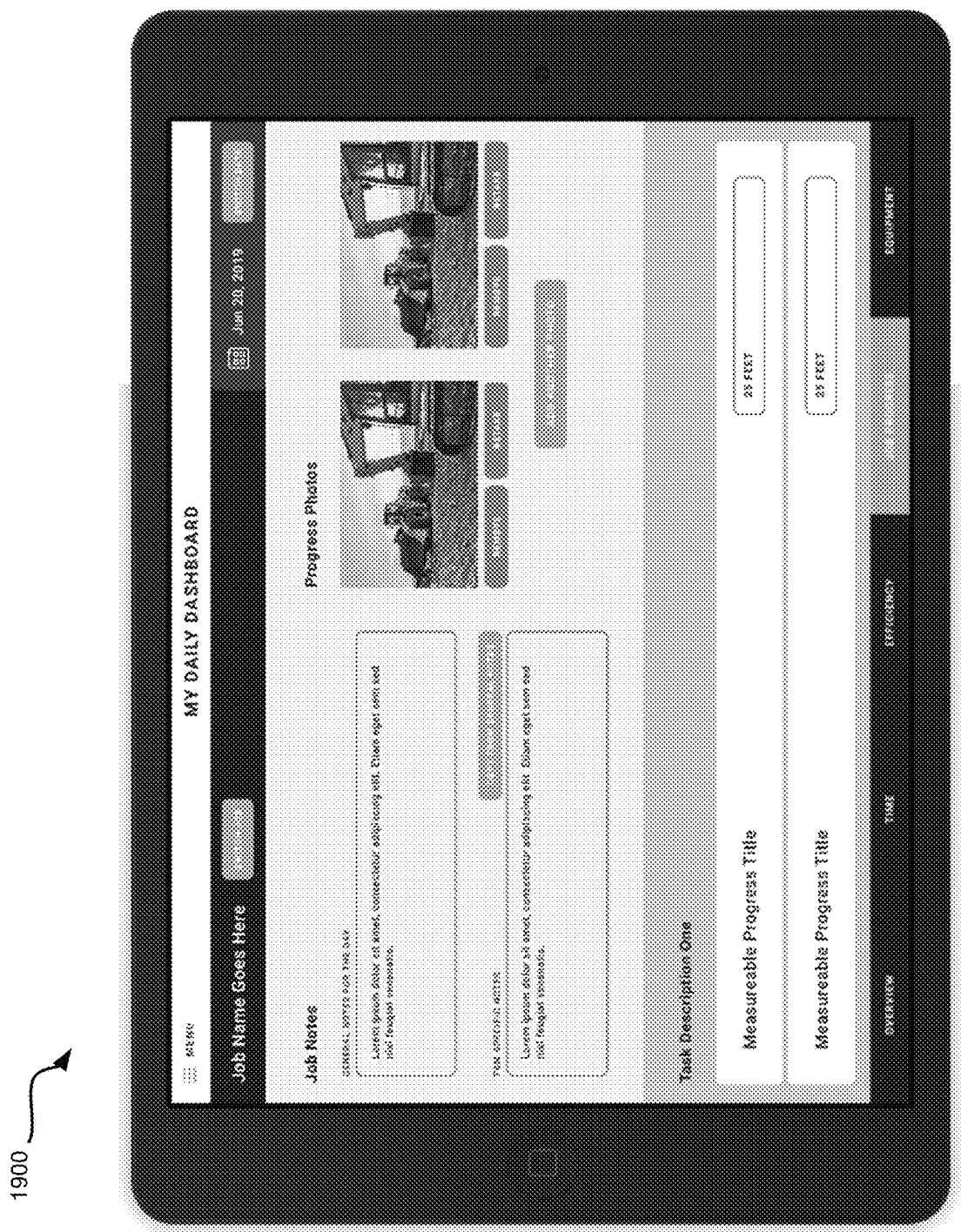
FIGS. 19-23 are screenshots of example user interfaces rendered by a data aggregation platform for ingesting and managing data pertaining to projects.

FIGS. 19-23 are screenshots of example user interfaces rendered by the data aggregation server 104. FIG. 19 is a screenshot of an example user interface 1900 rendered by the data aggregation server 104. The user interface 1900 depicts a daily dashboard that visualizes the updates and progress made to a certain project, job, or task. The user interface 1900 includes means for inputting notes about the job, including a description of what was accomplished on a certain date, issues that arose on a certain date, and so forth. The user interface 1900 includes a means to upload, edit, remove, and replace progress images pertaining to the job. The user interface 1900 includes means to input quantitative progress for a job, including, for example, and input of a certain length of material that has been installed, a number of minutes spent on the job, a quantity of materials used for the job, and so forth.

The dashboard includes data retrieved from independent database partitions, wherein the data may be stored in different sections of the same database or across independent databases. The dashboard illustrates notes that have been inputted for the job, progress photos for the job, and descriptions of tasks that must be completed for the job. The progress photos may be fed to a neural network trained to determine the progress of the job and whether the job is being performed according to safety standards.

The user interface 1900 may include a budgeting visualization that indicates whether a specific is currently on-trend for its projected budget. The user interface 1900 provides a visualization for granular details pertaining to the budget, including whether the project is on-pace for the predicted number of person-hours, the predicted cost of those person-hours, the predicted time for using or renting equipment, the predicted cost of materials, and so forth. The budget indicates how many person-hours are budgeted for a specific task and how many person-hours have been used for that task.

The data aggregation platform 102 retrieves information from multiple tables for rendering a visualization of the budget. For example, the database 112 includes a task unit table comprising a listing of task units that have been performed and whom they have been performed by. Each project includes multiple tasks, and each task may include multiple units to be performed. For example, if a project includes the task of laying 200 linear feet of piping, then the task of laying the piping includes 200 units representing the 200 linear feet. The task unit table comprises an indication of how many linear feet of piping have been laid, who laid those linear feet of piping, when they laid the linear feet of piping, and how many person-hours were required to lay those linear feet of piping. The data aggregation server 104 may calculate a cost-per-linear-foot for laying the piping based on the data stored in the task unit table for the specific task of laying the piping. Each task may have its own task unit table stored on the database 112.

The user interface 1900 illustrating the daily dashboard may further comprise an aggregation and visualization for selected or relevant task unit entries. This may indicate, for example, that Worker A, Worker B, and Worker C have collectively laid 10 feet of piping each day for three days in a row, and that an additional 50 feet of piping must be laid to finalize the task. The user interface 1900 may include an alert indicating that this task if over-budget. The user interface 1900 may include an alert indicating that some external event has altered the budget; for example, the cost of labor or materials may have risen since the budget was created. This analysis may be performed based on information retrieved from the third-party data sources.

Figure 20:
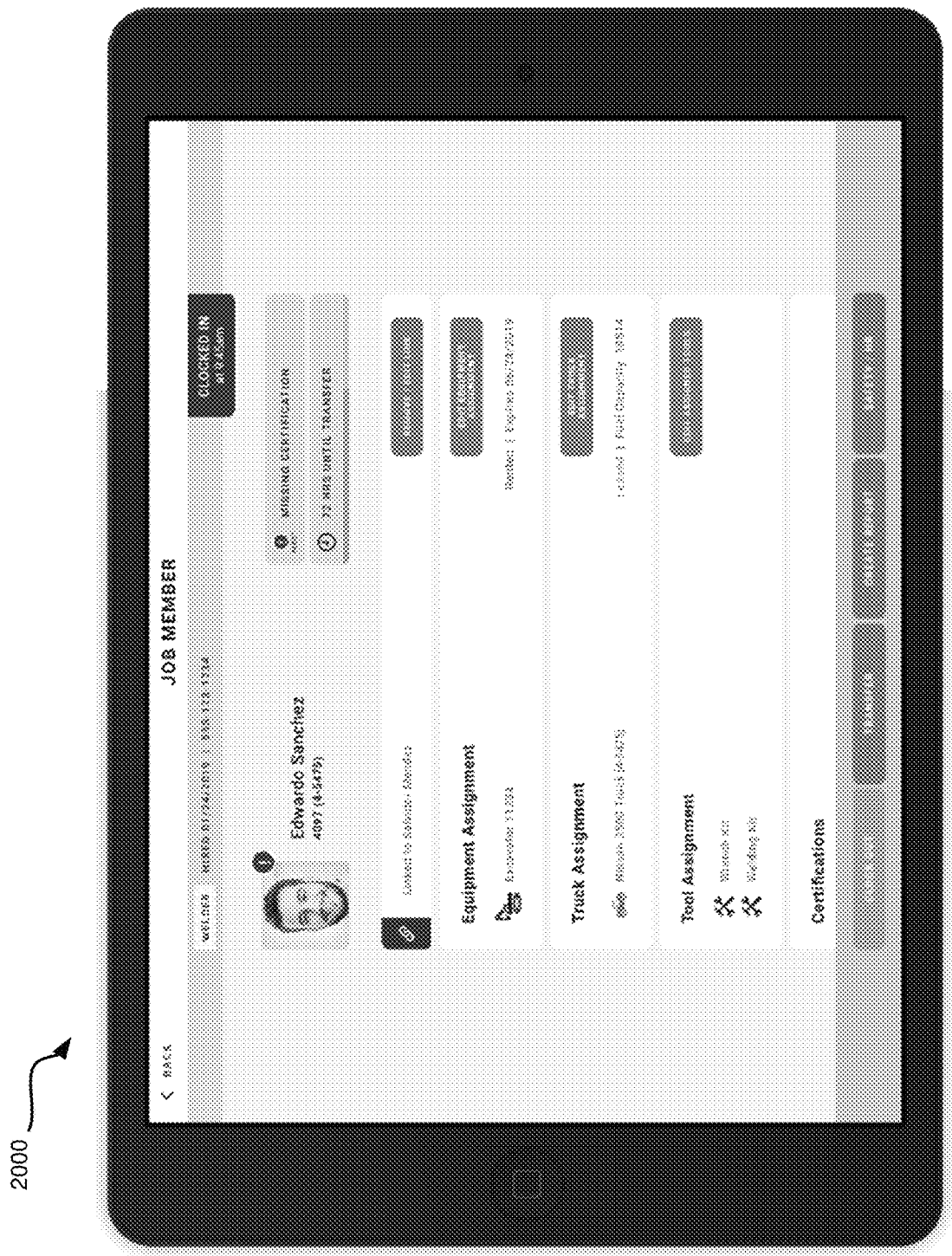

FIG. 20 is a screenshot of an example user interface 2000 rendered by the data aggregation server 104. The user interface 2000 specifically illustrates a profile associated with a job member that has been assigned to a task or job. The job member may be a contractor, employee, supervisor, tradesman, and so forth. The job member profile includes information about whether the person has been assigned, what equipment has been assigned to the person, what tools have been assigned to the person, and so forth.

The user interface 2000 implements consistent icons for representing equipment assignments, vehicle assignments, tool assignments, and certifications. This is useful when a plurality of workers is viewed at once, and each worker can be assigned an icon indicating that some equipment, vehicle, or tool is assigned to that worker and/or that worker possesses a special certification.

The user interface 2000 comprises an indication that the user (Edwardo Sanchez in the example) has 72 hours remaining until transfer to another project, task, or jobsite. The user interface 2000 further includes a flag indicating that Edwardo does not possess the requisite certification for a task that has been assigned to him.

Figure 21:
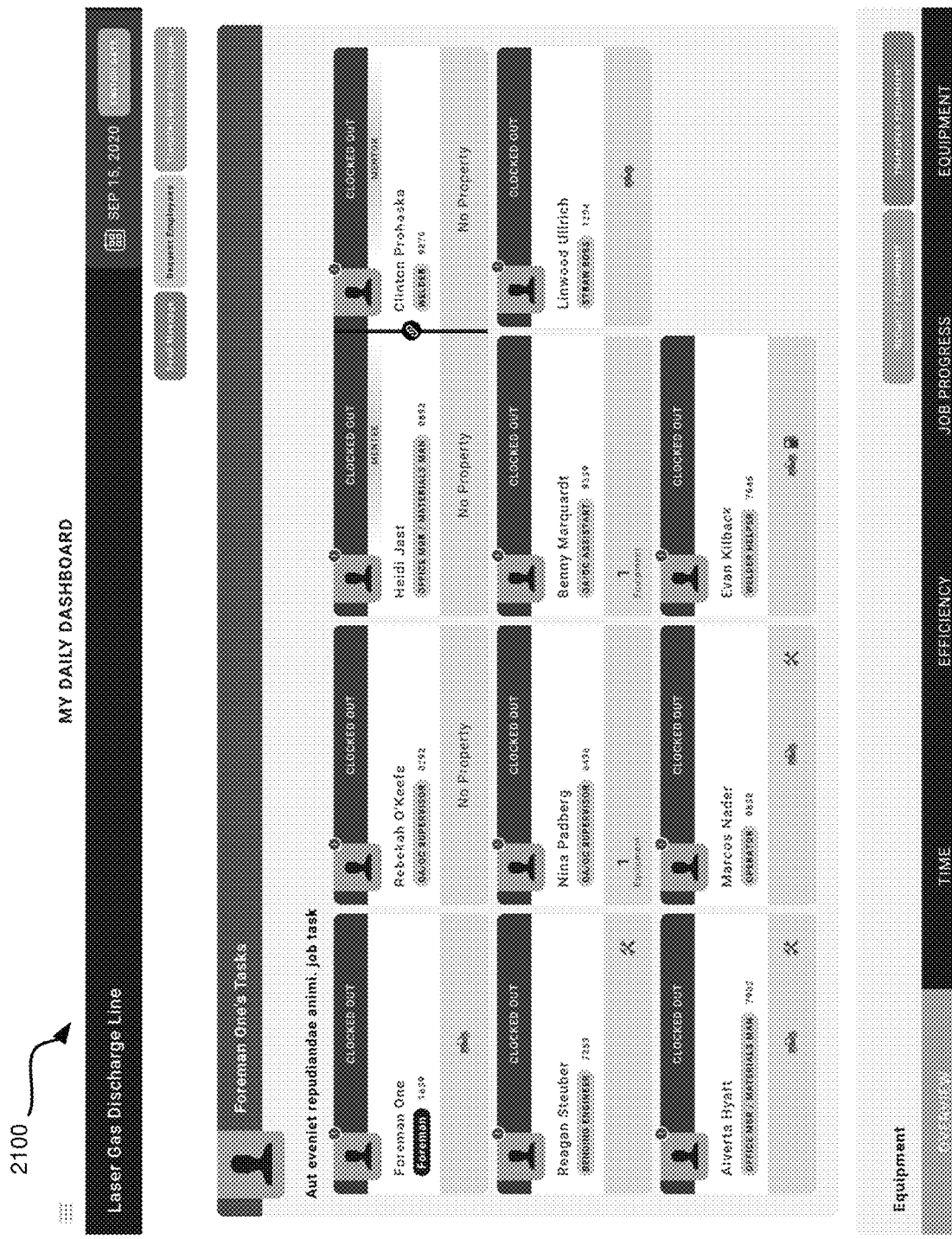

FIG. 21 is a screenshot of an example user interface 2100 rendered by the data aggregation server 104. The user interface 1100 includes a dashboard for assigning tasks to individuals and tracking the progress of those tasks. In the example illustrated in FIG. 21, the user interface 2100 illustrates tasks that are assigned to a particular supervisor and further illustrates the profiles of various employees and contractors that report to that same supervisor. The user interface 2100 may be presented only to the supervisor and may provide the supervisor with read and write permissions to adjust where various workers are assigned, what equipment is assigned to the various workers, and what tasks the workers are assigned to do.

The user interface 2100 implements icons on each profile to indicate whether that person has been assigned any equipment or tools. For example, in the user interface 2100, Rebekah O'Keefe and Heidi Jast have not been assigned any property; but Alverta Hyatt and Marcos Nadar have each been assigned equipment and tools.

The user interface 2100 provides a visualization for quickly seeing the overview for each worker assigned to a task, viewing the time spent by each worker on the task, seeing the efficiency of each worker in completing the task, seeing the progress of the task, and seeing the equipment assigned to the task.

Figure 22:
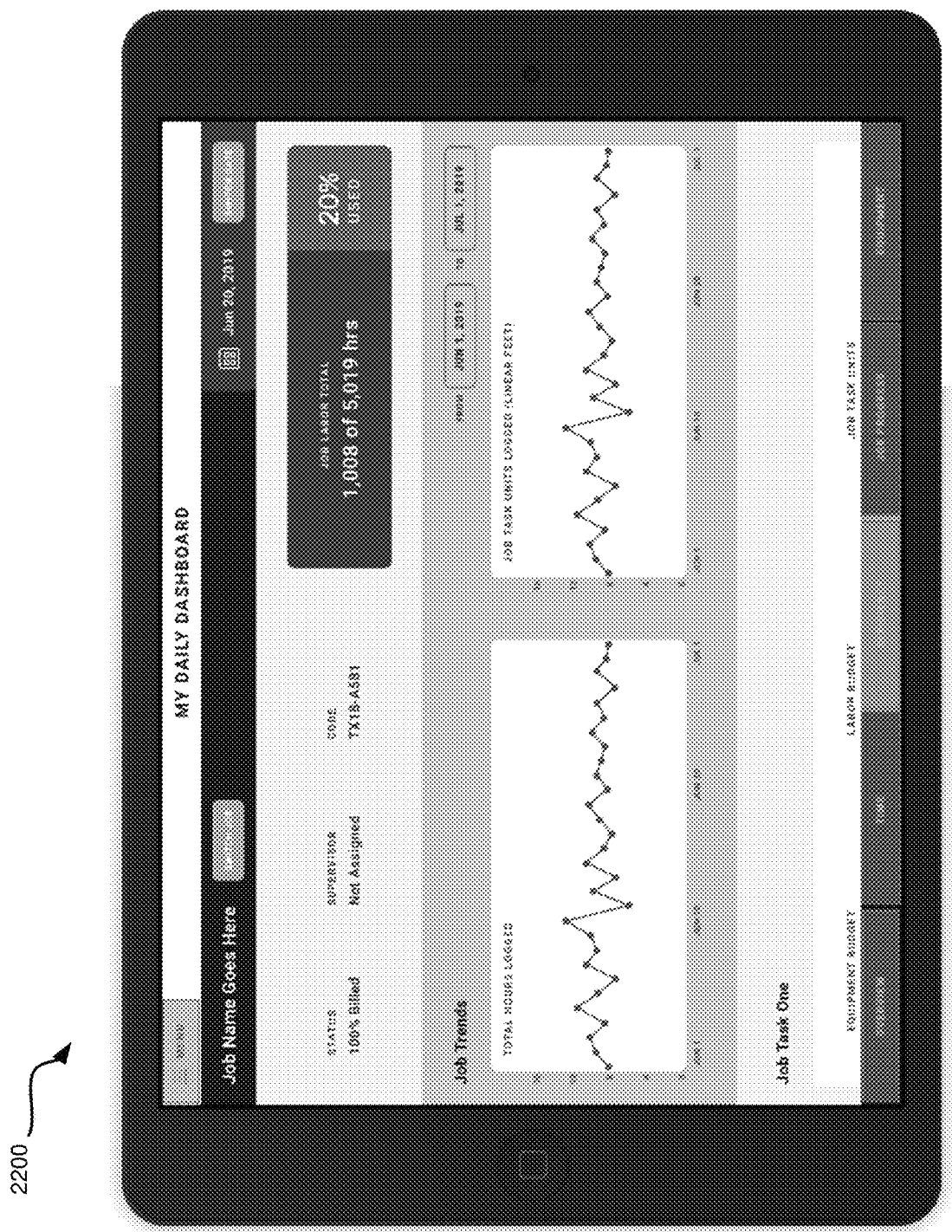

FIG. 22 is a screenshot of an example user interface 2200 rendered by the data aggregation server 104. The user interface 2200 includes means for visualizing data over a time period. The data may include, for example, job trends, revenue trends, task trends, equipment rental trends, and so forth. In an example implementation, the user interface 2200 is used for managing a construction project. In this implementation, the graphs and charts may be generated to visualize the progress of the construction project. For example, the graphs may illustrate the length of materials that is installed per day, the person-hours worked per day, the tasks accomplished per day, the quantity of materials installed per day, and so forth as needed.

Figure 23:
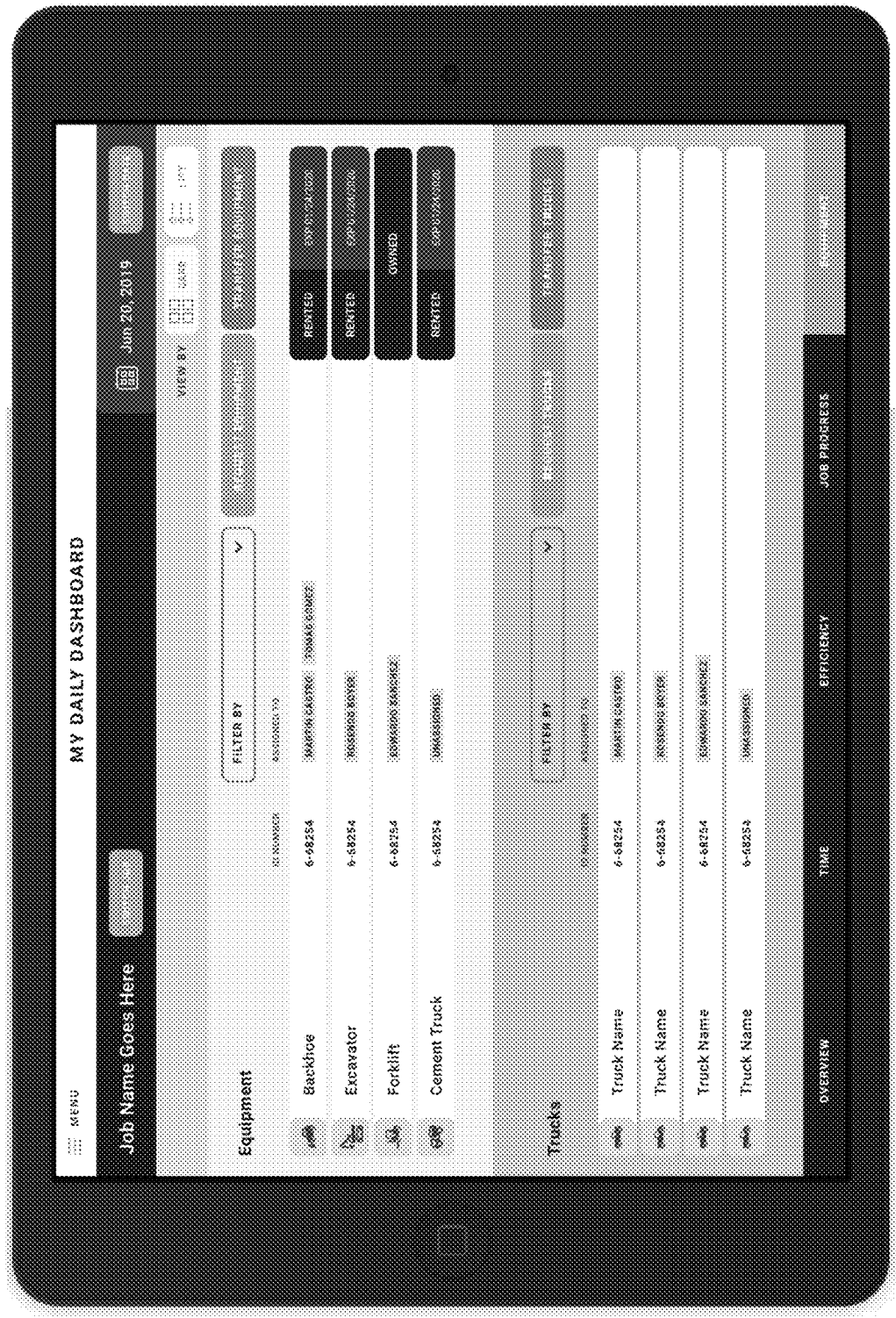

FIG. 23 is a screenshot of an example user interface 2300 rendered by the data aggregation server 104. The user interface 2300 illustrates means for tracking the whereabout and costs of different equipment, vehicles, and tools.

The data aggregation platform 104 enables broadscale functionality for simultaneously managing personnel, equipment, contracts, and tasks for projects. Specifically, the data aggregation platform 104 provides a means for a user to request an employee or contract to be assigned to a project. The user may select one of the available employees or contractors from a labor marketplace. The labor marketplace includes information about available employees and contractors, including their names, personal photos (if applicable), information about former jobs and employment, relevant certifications and skillsets, and current and future availability. The data aggregation platform 104 provides a means for a user to view more information about an employee or contractor and request that the employee or contractor be assigned to a certain job.

The data aggregation server 104 renders the user interfaces based on data retrieved from the database 112. The database 112 is organized on the backend with a plurality of independent tables that are all related within a relational database system. The user interfaces illustrated herein are specifically drawn to a particular use-case wherein the data aggregation platform 102 is leveraged for managing construction projects, including home building projects, commercial building projects, government construction projects, transportation construction projects, utility construction projects, and so forth. In these use-cases, the database 112 is organized with a plurality of interrelated tables that each comprise information pertaining to project management.

For example, the database 112 comprises a table with timeclock entries for a plurality of different workers assigned to a project. The timeclock entries comprise an indication of which task each worker was performing over a certain time period, and these tasks relate the timeclock entries to an independent table comprising information about all tasks that must be completed to finalize the project. Further, each time clock entry comprises related task unit entries that may quantify the work performed in the defined time period. For example, in the road construction or utility construction implementations, the task unit entries may comprise an indication of what length of utility was installed in that time, or what length of asphalt was laid in that time, and so forth. These related tables can be leveraged to inform a supervisor or project manager of how much work is being performed, what type of work is being performed, how much time each task is consuming, how many workers are performing each task, how much budget is being consumed by each task, what equipment is being used for each task, and so forth.

The data aggregation platform 104 further provides a means for a user to transfer an employee or contractor from one task to another task, or from one job or project to another job or project. The user interface displays the employees or contractors that are currently assigned to the first task and the employees or contractors that are currently assigned to the second task.

The data aggregation platform 104 further provides a means for assigning tasks and timesheet data to a plurality of different individuals. The user interface may include a sliding bar for inputting timesheet data, wherein the bar can be slid to the left and the right on both ends to quickly input when the worker began working and when the worker ceased working. The user interface presents a total time worked for the worker on that date and may further present the total time worked over any defined time period.

In an implementation, each worker clocks in by submitting an image of the worker at the jobsite. The time the image is captured or submitted may be initially used as the clock-in time for that user. This may be overruled by the worker or the worker's supervisor. The metadata for the image may be read to verify the image was actually taken recently and at the geographical coordinates for the jobsite. The image may additionally be provided to the neural network 118 to perform facial recognition analysis and determine whether the worker depicted in the photo is the same as the worker claiming to be clocking in. The user interface may be a foreman's or supervisor's view of all workers performing a certain task. The supervisor may review all clock-ins for all workers and approve, deny, or adjust the clock-in time for each worker.

In an implementation, the supervisor or supervisor clocks in all workers. The supervisor or supervisor may add all workers who are present. In another implementation, the list of workers expected to be present that day may be auto populated, and then the supervisor removes the workers who did not show up that day. The timestamp that represents when the supervisor began clocking workers in may be assigned to all workers regardless of when the supervisor clocked in each individual user.

The data aggregation platform 104 further provides a means to view the allocation of an individual's time to different projects. In an implementation, an individual's time spent travelling and time spent working may be tracked and analyzed. The user interface may include a sliding bar for quickly adjusting how an individual's time was spent.

Figure 24:
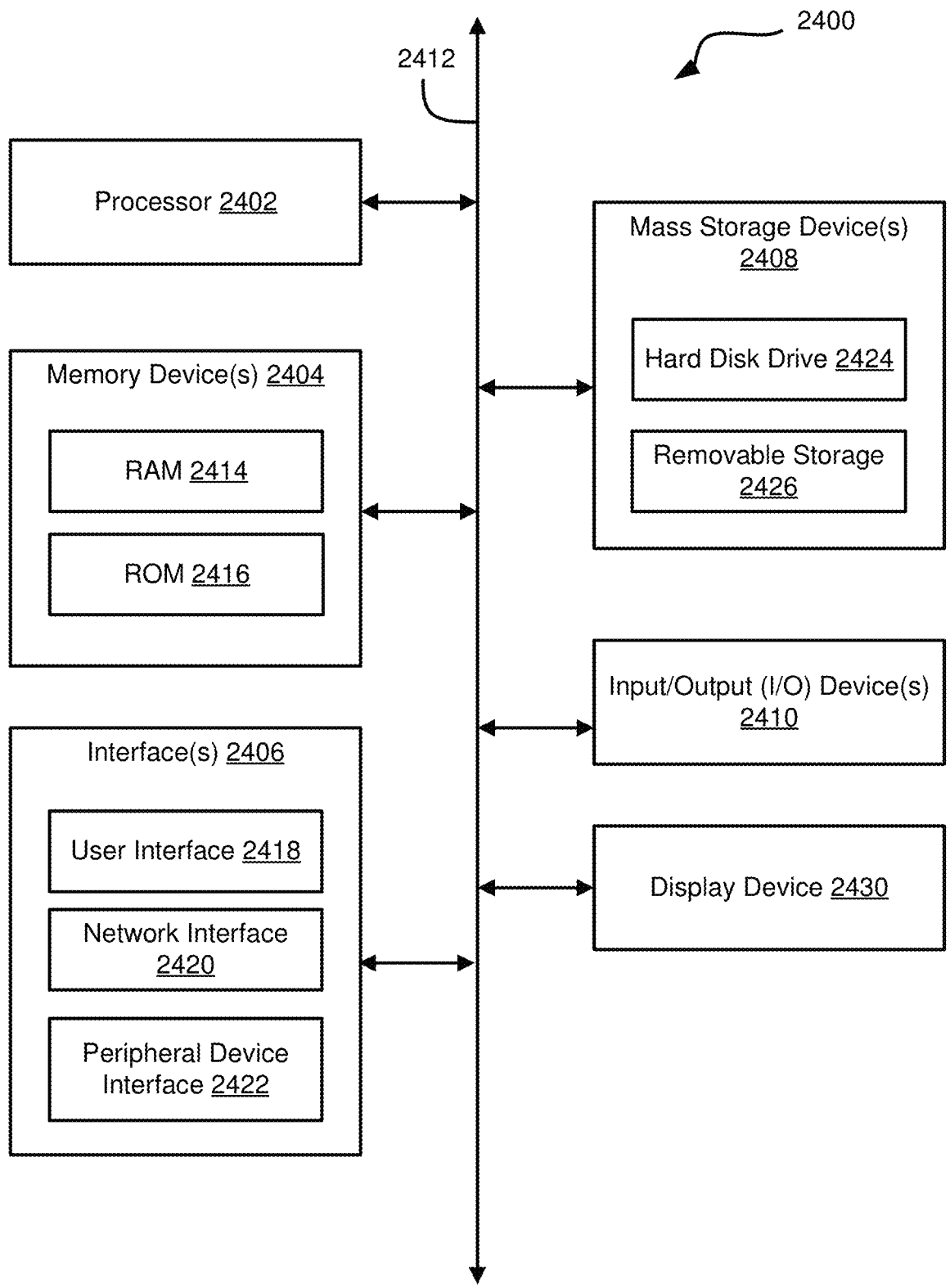
FIG. 24 illustrates a block diagram of an example computing device in accordance with the teachings and principles of the disclosure

Referring now to FIG. 24, a block diagram of an example computing device 2400 is illustrated. Computing device 2400 may be used to perform various procedures, such as those discussed herein. Computing device 2400 can perform various monitoring functions as discussed herein, and can execute one or more application programs, such as the application programs or functionality described herein. Computing device 2400 can be any of a wide variety of computing devices, such as a desktop computer, in-dash computer, vehicle control system, a notebook computer, a server computer, a handheld computer, tablet computer and the like.

Computing device 2400 includes one or more processor(s) 2402, one or more memory device(s) 2404, one or more interface(s) 2406, one or more mass storage device(s) 2408, one or more Input/output (I/O) device(s) 2410, and a display device 2430 all of which are coupled to a bus 2412. Processor(s) 2402 include one or more processors or controllers that execute instructions stored in memory device(s) 2404 and/or mass storage device(s) 2408. Processor(s) 2402 may also include various types of computer-readable media, such as cache memory.

Memory device(s) 2404 include various computer-readable media, such as volatile media (e.g., random access memory (RAM) 2414) and/or nonvolatile memory (e.g., read-only memory (ROM) 2416). Memory device(s) 2404 may also include rewritable ROM, such as Flash memory.

Mass storage device(s) 2408 include various computer readable media, such as magnetic tapes, magnetic disks, optical disks, solid-state memory (e.g., Flash memory), and so forth. As shown in FIG. 24, a particular mass storage device 2408 is a hard disk drive 2424. Various drives may also be included in mass storage device(s) 2408 to enable reading from and/or writing to the various computer readable media. Mass storage device(s) 2408 include removable media 2426 and/or non-removable media.

I/O device(s) 2410 include various devices that allow data and/or other information to be input to or retrieved from computing device 2400. Example I/O device(s) 2410 include cursor control devices, keyboards, keypads, microphones, monitors or other display devices, speakers, printers, network interface cards, modems, barcode scanners, and the like.

Display device 2430 includes any type of device capable of displaying information to one or more users of computing device 2400. Examples of display device 2430 include a monitor, display terminal, video projection device, and the like.

Interface(s) 2406 include various interfaces that allow computing device 2400 to interact with other systems, devices, or computing environments. Example interface(s) 2406 may include any number of different network interfaces 2420, such as interfaces to local area networks (LANs), wide area networks (WANs), wireless networks, and the Internet. Other interface(s) include user interface 2418 and peripheral device interface 2422. The interface(s) 2406 may also include one or more user interface elements 2418. The interface(s) 2406 may also include one or more peripheral interfaces 2422 such as interfaces for printers, pointing devices (mice, track pad, or any suitable user interface now known to those of ordinary skill in the field, or later discovered), keyboards, and the like.

Bus 2412 allows processor(s) 2402, memory device(s) 2404, interface(s) 2406, mass storage device(s) 2408, and I/O device(s) 2410 to communicate with one another, as well as other devices or components coupled to bus 2412. Bus 2412 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 900 and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a system. The system includes a resource manager in communication with a network. The system includes an execution platform comprising a plurality of processing nodes, wherein each of the plurality of processing nodes is assigned to a client account of a plurality of client accounts coupled to the resource manager. The system includes a database comprising a plurality of database instances, wherein each of the plurality of database instances is assigned to a client account of the plurality of client accounts coupled to the resource manager.

Example 2 is a system as in Example 1, wherein the resource manager comprises processors for executing instructions stored in non-transitory computer readable storage media, the instructions comprising ingesting data from each of the plurality of client accounts by way of a data ingestion engine, wherein the data ingestion engine is coupled to the database.

Example 3 is a system as in any of Examples 1-2, wherein the instructions further comprise normalizing the data to a format readable by the resource manager.

Example 4 is a system as in any of Examples 1-3, wherein the instructions further comprise partitioning the normalized data across the database, wherein each database instance comprises a plurality of tables.

Example 5 is a system as in any of Examples 1-4, wherein each of the plurality of database instances comprises a plurality of independent tables.

Example 6 is a system as in any of Examples 1-5, wherein each of the plurality of database instances comprises a metadata store, wherein the metadata store comprises data pointing to where information is stored on the database.

Example 7 is a system as in any of Examples 1-6, wherein each of the plurality of database instances comprises a bucket for storing non-structured data, wherein the non-structured data comprises files comprising one or more of an image, a video, a document, a scan, or an audio recording.

Example 8 is a system as in any of Examples 1-7, wherein the metadata store comprises a media table, wherein the media table comprises metadata for the files stored on the bucket, and wherein the media table comprises an indication of where files can be located within the bucket.

Example 9 is a system as in any of Examples 1-8, wherein the execution platform communicates with one or more third-party data sources by way of an Application Programming Interface (API).

Example 10 is a system as in any of Examples 1-9, wherein the execution platform renders a user interface for managing a project and visualizing progression of the project.

Example 11 is a system as in any of Examples 1-10, wherein the user interface comprises a sliding bar for portioning time to two or more projects, wherein the sliding bar comprises a first sliding bar for partitioning time to a first project and further comprises a second sliding bar for partitioning time to a second project.

Example 12 is a system as in any of Examples 1-11, wherein the instructions further comprise receiving a first data packet from a first provider and receiving a second data packet from the first provider.

Example 13 is a system as in any of Examples 1-12, wherein the instructions further comprise: determining whether the second data packet is a duplicate of the first data packet based on an identity of the provider of the data packet and contents of the data packet; in response to determining the second data packet is a duplicate of the first data packet, discarding the second data packet and providing only the first data packet to a data packet queue.

Example 14 is a system as in any of Examples 1-13, wherein the instructions further comprise, in response to determining the second data packet is not a duplicate of the first data packet, discarding the first data packet and providing the second data packet to the data packet queue.

Example 15 is a system as in any of Examples 1-14, wherein a size of the data packet queue is minimized to reduce a file load to be downloaded by a communication device.

Example 16 is a system as in any of Examples 1-15, wherein the instructions further comprise minimizing the size of the data packet queue when the communication device cannot connect to a network.

Example 17 is a system as in any of Examples 1-16, wherein the database comprises each of a project table, a worker table, and an equipment table, and wherein each of the project table, the worker table, and the equipment table is independent of other tables stored on the database.

Example 18 is a system as in any of Examples 1-17, wherein the project table comprises one or more tables directed to projects associated with a client account of the plurality of client accounts, and wherein the project table comprises an independent job table for each job executed in furtherance of the project.

Example 19 is a system as in any of Examples 1-18, wherein the worker table comprises one or more tables comprising information about available employees and/or contractors in a worker marketplace.

Example 20 is a system as in any of Examples 1-19, wherein the worker table comprises one or more tables comprising information about authenticated user accounts, wherein each of the authenticated user accounts is associated with a real-world individual.

Example 21 is a system as in any of Examples 1-20, wherein the equipment table comprises one or more tables comprising information about equipment or tools to be purchased or rented, and further comprising information about whether the equipment or tools are assigned to a certain worker, project, or job site.

Example 22 is a system as in any of Examples 1-21, wherein the metadata store is a polymorphic many-to-many table.

Example 23 is a system as in any of Examples 1-22, wherein the instructions further comprise: receiving image data depicting a unique code; performing a lookup on the unique code to identify which database instance is associated with the unique code and which table within the database instance is associated with the unique code; and providing instructions to a communication device to access a user interface presenting information stored in the corresponding table within the corresponding database instance.

Example 24 is a method. The method includes aggregating data from a plurality of different data sources, wherein the data comprises equipment data and personnel data pertaining to a project. The method includes generating a longitudinal data bucket comprising information associated with the project for tracking the equipment data and the personnel data over time; and storing the longitudinal data bucket on a database. The method includes assigning permissions to different types of data stored in the longitudinal data bucket such that a plurality of users of the database have personalized read and/or write permissions to the equipment data and the personnel data.

Example 25 is a method as in Example 24, wherein aggregating the data from the plurality of different data sources comprises receiving data inputs from at least a portion of the plurality of users.

Example 26 is a method as in any of Examples 24-25, wherein the database is a cloud-network database, and wherein the method further comprises: receiving a data input from a communication device associated with one of the plurality of users; and receiving an IP address associated with the communication device when the communication device transmits the data input to the database.

Example 27 is a method as in any of Examples 24-26, further comprising calculating a confidence score indicating a likelihood the data input is accurate based at least in part on the IP address.

Example 28 is a method as in any of Examples 24-27, wherein calculating the confidence score comprises calculating further based on one or more of session information associated with the communication device transmitting the data input to the database, or a user-agent string associated with the communication device transmitting the data input to the database.

Example 29 is a method as in any of Examples 24-28, wherein calculating the confidence score comprises calculating further based on one or more of GPS data indicating a location of the communication data when the communication device transmitted the data input to the database.

Example 30 is a method as in any of Examples 24-29, further comprising: receiving a data input from a first user of the plurality of users, wherein the data input pertains to a first data type; cross-checking the permissions to determine whether the first user has permission to amend data comprising the first data type; in response to determining the first user has permission, storing the data input on the longitudinal data bucket; and in response to determining the first user does not have permission, rejecting the data input.

Example 31 is a method as in any of Examples 24-30, wherein the equipment data comprises a unique data entry for one or more of a plurality of equipment units assigned to the project.

Example 32 is a method as in any of Examples 24-31, wherein the equipment data further comprises a rental agreement contract for each rented equipment unit assigned to the project.

Example 33 is a method as in any of Examples 24-32, further comprising tracking usage of each rented equipment unit assigned to the project over time; and generating a user notification when a rented equipment unit is due to be returned.

Example 34 is a method as in any of Examples 24-33, wherein the equipment data further comprises one or more equipment inspection reports.

Example 35 is a method as in any of Examples 24-34, further comprising tracking the one or more equipment inspection reports over time for a first equipment unit; and generating a user notification when the first equipment unit is due for an inspection.

Example 36 is a method as in any of Examples 24-35, wherein the longitudinal data bucket comprises one or more tables, and wherein the database is a relational database.

Example 37 is a method as in any of Examples 24-36, wherein the personnel data comprises a unique data entry for each person assigned to the project; and wherein at least one person assigned to the project is linked to an equipment unit identified in the equipment data.

Example 38 is a method as in any of Examples 24-37, wherein the personnel data comprises a plurality of timecard entries for a plurality of persons assigned to the project; and wherein the method further comprises tracking a total person-hour expenditure for the project based at least in part on the plurality of timecard entries.

Example 39 is a method. The method includes storing a plurality of data entries in a project bucket on a database, wherein the plurality of data entries represents information applicable to a plurality of data units associated with a project. The method includes organizing at least a portion of the plurality of data units according to a polymorphous data schema. The method includes linking two or more data units of the plurality of data units to generate a project linkage. The method includes restricting a user from removing only a portion of the project linkage from the project without first manually breaking the project linkage.

Example 40 is a method as in Example 39, wherein the plurality of data entries comprises a plurality of personnel data entries applicable to the project, and wherein at least a portion of the plurality of personnel data entries is stored on a unique personnel table within the project bucket.

Example 41 is a method as in any of Examples 39-40, wherein the plurality of data entries comprises a plurality of personnel data entries applicable to the project, and wherein the plurality of personnel data entries comprises a unique data entry for each person assigned to the project.

Example 42 is a method as in any of Examples 39-41, wherein the plurality of data entries comprises a plurality of equipment data entries applicable to the project, and wherein at least a portion of the plurality of equipment data entries is stored on a unique equipment table within the project bucket.

Example 43 is a method as in any of Examples 39-42, wherein the plurality of data entries comprises a plurality of equipment data entries applicable to the project, and wherein the plurality of equipment data entries comprises a unique data entry for each equipment unit or equipment grouping assigned to the project.

Example 44 is a method as in any of Examples 39-43, wherein the project comprises a construction project, and wherein the plurality of data entries comprises: a plurality of longitudinal data entries indicating time worked by a plurality of persons assigned to the project over time; and a plurality of longitudinal data entries indicating equipment time used for a plurality of equipment units assigned to the project.

Example 45 is a method as in any of Examples 39-44, wherein the two or more data entries comprises a first data entry comprising a person assigned to the project and a second data entry comprising an equipment unit or equipment grouping assigned to the project.

Example 46 is a method as in any of Examples 39-45, wherein the two or more data entries comprises a first data entry comprising a first equipment assigned to the project and a second data entry comprising a second equipment assigned to the project.

Example 47 is a method as in any of Examples 39-46, wherein linking the two or more data units comprises establishing a foreign key dependency between the two or more data units.

Example 48 is a method as in any of Examples 39-47, further comprising: receiving a user request to move at least a portion of the project linkage from the project; and automatically moving each of the two or more data units of the project linkage from the project in response to the user request.

Example 49 is a method as in any of Examples 39-48, further comprising identifying one or more data units of the plurality of data units that must be linked to another data unit prior to being assigned to the project.

Example 50 is a method as in any of Examples 39-49, further comprising generating a user notification indicating that the one or more data units cannot be assigned to the project without first linking the one or more data units to another data unit.

Example 51 is a method as in any of Examples 39-50, wherein the one or more data units that cannot be assigned to the project without being linked represent real-world equipment to be assigned to the project, and wherein the real-world equipment cannot be assigned to the project without also being assigned to a person associated with the project.

Example 52 is a method as in any of Examples 39-51, wherein linking the two or more data units comprises generating a tool package comprising a plurality of tool types.

Example 53 is a method as in any of Examples 39-52, further comprising restricting user-initiated amendments to the project bucket such that tools associated with each of the plurality of tool types within the tool package can only be exchanged for another tool of the same tool type.

Example 54 is a method as in any of Examples 39-53, wherein the project bucket comprises a longitudinal data scheme for tracking data associated with the project over time.

Example 55 is a method as in any of Examples 39-54, wherein the project bucket comprises a plurality of independent tables comprising: a personnel table comprising information pertaining to a plurality of persons assigned to the project; and an equipment table comprising information pertaining to a plurality of equipment units or equipment groupings assigned to the project.

Example 56 is a method as in any of Examples 39-55, wherein the plurality of independent tables of the project bucket further comprises a metadata table, wherein the metadata table comprises metadata pertaining to one or more unstructured files associated with the project.

Example 57 is a method as in any of Examples 39-56, wherein the project bucket further comprises a datastore for storing unstructured files associated with the project.

Example 58 is a method as in any of Examples 39-57, wherein the plurality of independent tables further comprises a task table for tracking a plurality of tasks to be executed pursuant to the project.

Example 59 is a method. The method includes determining that a receiver device is offline and cannot communicate with a server. The method includes providing a plurality of data packets to a data packet queue. The method includes receiving an update to an existing data packet stored within the data packet queue. The method includes minimizing a total memory requirement for the data packet queue by replacing the existing data packet with the update. The method includes, in response to determining the receiver device is now online, communicating the data packet queue to the receiver device over a network.

Example 60 is a method as in Example 59, wherein determining the receiver device is offline comprises determining with a listener configured to ping the receiver device at regular intervals.

Example 61 is a method as in any of Examples 59-60, wherein the data packet queue comprises a data packet from a plurality of different providers.

Example 62 is a method as in any of Examples 59-61, wherein minimizing the total memory requirement for the data packet queue comprises providing only a most recent data packet for each of the plurality of different providers within the data packet queue.

Example 63 is a method as in any of Examples 59-62, further comprising assessing the data packet queue to identify two or more duplicate data packets within the data packet queue.

Example 64 is a method as in any of Examples 59-63, wherein minimizing the total memory requirement for the data packet queue further comprising deleting all but one of the two or more duplicate data packets within the data packet queue.

Example 65 is a method as in any of Examples 59-64, wherein the data packet queue comprises data retrieved from a project bucket, and wherein the project bucket comprises information applicable to a project.

Example 66 is a method as in any of Examples 59-65, wherein the project bucket comprises: a plurality of personnel data entries comprising information applicable to persons assigned to the project; a plurality of equipment data entries comprising information applicable to equipment assigned to the project; and a plurality of task data entries comprising information applicable to a plurality of tasks to be completed for the project.

Example 67 is a method as in any of Examples 59-66, wherein the receiver device is a mobile communication device, and wherein the receiver device is associated with a user comprising permissions to read data stored within the project bucket.

Example 68 is a method as in any of Examples 59-67, further comprising generating a user notification indicating the receiver device is offline.

Example 69 is a system. The system includes a mobile communication device and a server, wherein the mobile communication device communicates with the server by way of a network connection. The server is configured to execute instructions comprising: determining the mobile communication device is offline and cannot communicate with the server; providing a plurality of data packets to a data packet queue; receiving an update to an existing data packet stored within the data packet queue; minimizing a total memory requirement for the data packet queue by replacing the existing data packet with the update; and in response to determining the mobile communication device is now online, communicating the data packet queue to the mobile communication device over the network.

Example 70 is a system as in Example 69, wherein the instructions are such that determining the mobile communication device is offline comprises determining with a listener configured to ping the mobile communication device at regular intervals.

Example 71 is a system as in any of Examples 69-70, wherein the data packet queue comprises a data packet from a plurality of different providers.

Example 72 is a system as in any of Examples 69-71, wherein the instructions are such that minimizing the total memory requirement for the data packet queue comprises providing only a most recent data packet for each of the plurality of different providers within the data packet queue.

Example 73 is a system as in any of Examples 69-72, wherein the instructions further comprise assessing the data packet queue to identify two or more duplicate data packets within the data packet queue.

Example 74 is a system as in any of Examples 69-73, wherein the instructions are such that minimizing the total memory requirement for the data packet queue further comprising deleting all but one of the two or more duplicate data packets within the data packet queue.

Example 75 is a system as in any of Examples 69-74, wherein the data packet queue comprises data retrieved from a project bucket, and wherein the project bucket comprises information applicable to a project.

Example 76 is a system as in any of Examples 69-75, wherein the project bucket comprises: a plurality of personnel data entries comprising information applicable to persons assigned to the project; a plurality of equipment data entries comprising information applicable to equipment assigned to the project; and a plurality of task data entries comprising information applicable to a plurality of tasks to be completed for the project.

Example 77 is a system as in any of Examples 69-76, wherein the mobile communication device is associated with a user comprising permissions to read data stored within the project bucket.

Example 78 is a system as in any of Examples 69-77, wherein the instructions further comprise generating a user notification indicating the mobile communication device is offline.

The embodiments of systems, methods, and devices discussed herein may be applied to a wide range of sample types for detection of various particles, materials, or the like. The following paragraphs describe diverse types of samples which may be imaged and identified using methods, systems, or devices disclosed herein.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to emphasize their implementation independence more particularly. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by diverse types of processors. An identified component of executable code may, for instance, include one or more physical or logical blocks of computer instructions, which may, for instance, be organized as an object, a procedure, or a function. Nevertheless, the executables of an identified component need not be physically located together but may include disparate instructions stored in separate locations that, when joined logically together, include the component, and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over separate locations including over different storage devices, and may exist, at least partially, merely as electronic signals on a system or network. The components may be passive or active, including agents operable to perform desired functions.

Implementations of the disclosure can also be used in cloud computing environments. In this application, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, or any suitable characteristic now known to those of ordinary skill in the field, or later discovered), service models (e.g., Software as a Service (SaaS), Platform as a Service (PaaS), Infrastructure as a Service (IaaS)), and deployment models (e.g., private cloud, community cloud, public cloud, hybrid cloud, or any suitable service type model now known to those of ordinary skill in the field, or later discovered). Databases and servers described with respect to the disclosure can be included in a cloud model.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the claims, if any.

What is claimed is:

1. A method comprising:
   partitioning a cloud computing database according to a polymorphous data schema, wherein the cloud computing database comprises:
      a primary table dedicated to storing information applicable to a plurality of project units that may be temporarily applied to any of a plurality of projects; and
      a first project bucket dedicated to storing information applicable to only a first project of the plurality of projects, wherein the first project bucket comprises a secondary table;
      wherein the secondary table is a dependent table;
   identifying a first data entry stored on the primary table, wherein the first data entry comprises information regarding a first project unit to be utilized in association with the first project;
   linking the first data entry stored on the primary table to the secondary table by generating a project linkage, wherein the project linkage comprises a foreign key dependency enforcing a link between the primary table and the secondary table; and
   restricting a user from removing the first project unit from the first project without first breaking the project linkage for the first data entry;
   wherein the project linkage comprises a mapping stored on the secondary table that points to the first data entry stored on the primary table.

2. The method of claim 1, wherein the plurality of project units comprises a plurality of personnel that may be temporarily applied to any of the plurality of projects, and wherein the primary table is dedicated to storing only personnel data entries.

3. The method of claim 1, wherein the plurality of project units comprises a plurality of personnel, and wherein each of the plurality of personnel is associated with a unique data entry stored on the primary table.

4. The method of claim 1, wherein the plurality of project units comprises a plurality of equipment that may be temporarily applied to any of the plurality of projects, and wherein the primary table is dedicated to storing only equipment data entries.

5. The method of claim 1, wherein the plurality of project units comprises a plurality of equipment, and wherein each of the plurality of equipment is associated with a unique data entry stored on the primary table.

6. The method of claim 1, wherein the first project comprises a construction project, and wherein information stored on the first project bucket comprises:
   a plurality of longitudinal data entries indicating time worked by a plurality of persons assigned to the project over time; and
   a plurality of longitudinal data entries indicating equipment time used for a plurality of equipment units assigned to the project.

7. The method of claim 1, wherein the first data entry comprises a person or person grouping that may be temporarily assigned to the first project; and
   wherein the person grouping comprises a plurality of personnel that are assigned to as a single unit.

8. The method of claim 1, wherein the first data entry comprises an equipment or equipment grouping that may be temporarily assigned to the first project; and wherein the equipment grouping comprises a plurality of equipment units that are assigned as a single unit.

9. The method of claim 1, wherein the foreign key dependency is established between the first data entry stored on the primary table, and information applicable to the first project that is stored on the secondary table.

10. The method of claim 1, further comprising identifying two or more project units of the plurality of project units that are linked to one another and must be assigned to the same project of the plurality of projects.

11. The method of claim 1, further comprising:
   determining the first project unit must be linked to a second project unit prior to linking the first project unit to the secondary table; and
   generating a user notification indicating that the first project unit cannot be assigned to the first project without first linking the first project unit to the second project unit.

12. The method of claim 11, wherein the first project unit represents real-world equipment to be assigned to the first project;
   wherein the second project unit represents real-world personnel; and
   wherein the real-world equipment cannot be assigned to the first project without also being assigned to the real-world personnel.

13. The method of claim 1, further comprising linking two or more project units of the plurality of project units to generate a second project linkage, and wherein linking the two or more project units comprises generating a tool package comprising a plurality of tool types.

14. The method of claim 13, further comprising restricting user-initiated amendments to the second project linkage such that tools associated with each of the plurality of tool types within the tool package can only be exchanged for another tool of the same tool type.

15. The method of claim 1, wherein the first project bucket comprises a longitudinal data scheme for tracking data associated with the first project over time.

16. The method of claim 1, wherein the cloud computing database comprises a plurality of independent primary tables comprising:
   a personnel primary table comprising information pertaining to a plurality of persons available to be assigned to any of the plurality of projects; and
   an equipment primary table comprising information pertaining to a plurality of equipment units or equipment groupings available to be assigned to any of the plurality of projects.

17. The method of claim 16, wherein the cloud computing database further comprises a metadata table, and wherein the metadata table comprises metadata pertaining to one or more unstructured files associated with the project.

18. The method of claim 16, wherein the first project bucket further comprises a datastore for storing unstructured files associated with the project.

19. The method of claim 16, wherein the first project bucket further comprises a task table for tracking a plurality of tasks to be executed pursuant to the first project.

20. The method of claim 1, wherein the cloud computing database is portioned according to an ad hoc polymorphism model.

* * * * *